US009377803B2

(12) United States Patent
Watanabe et al.

(10) Patent No.: US 9,377,803 B2
(45) Date of Patent: Jun. 28, 2016

(54) VOLTAGE CONTROL APPARATUS, VOLTAGE CONTROL METHOD, AND POWER REGULATING APPARATUS

(71) Applicant: PANASONIC CORPORATION, Osaka (JP)

(72) Inventors: Kenichi Watanabe, Osaka (JP); Junji Kondoh, Ibaraki (JP)

(73) Assignee: PANASONIC CORPORATION, Osaka (JP)

( * ) Notice: Subject to any disclaimer, the term of this patent is extended or adjusted under 35 U.S.C. 154(b) by 628 days.

(21) Appl. No.: 13/665,155

(22) Filed: Oct. 31, 2012

(65) Prior Publication Data

US 2013/0134779 A1    May 30, 2013

(30) Foreign Application Priority Data

Oct. 31, 2011   (JP) ................................. 2011-239719
Oct. 18, 2012   (JP) ................................. 2012-230932

(51) Int. Cl.
*H02J 1/10*        (2006.01)
*H02J 3/38*        (2006.01)
(Continued)

(52) U.S. Cl.
CPC  *G05F 1/70* (2013.01); *G06Q 50/06* (2013.01); *H02J 3/12* (2013.01); *H02J 3/16* (2013.01); *H02J 13/002* (2013.01); *H02J 13/0062* (2013.01); *H02J 13/0075* (2013.01); *H02J 2003/143* (2013.01); *Y02B 70/3266* (2013.01); *Y02B 90/2615* (2013.01); *Y02B 90/2638* (2013.01); *Y02B 90/2653* (2013.01); *Y02E 40/34* (2013.01); *Y04S 20/242* (2013.01);
(Continued)

(58) Field of Classification Search
CPC ............. G05F 1/67; G05F 1/12; G05F 1/561; G05F 1/62; G05F 1/70; G05F 3/02; G05F 3/262; G05F 5/00
USPC .......................................................... 307/52
See application file for complete search history.

(56) References Cited

U.S. PATENT DOCUMENTS 3,827,148 A * 8/1974 Diliberto ........................ 433/122
4,041,370 A * 8/1977 Schroder ........................ 323/210
(Continued)

FOREIGN PATENT DOCUMENTS

JP          5-130739        5/1993
JP          6-15115         2/1994
(Continued)

*Primary Examiner* — Jared Fureman
*Assistant Examiner* — Esayas Yeshaw
(74) *Attorney, Agent, or Firm* — Wenderoth, Lind & Ponack, L.L.P.

(57) ABSTRACT

A voltage control apparatus includes: an obtaining unit which obtains voltage values at voltage measuring points; a detecting unit which detects a system impedance value; a control quantity calculating unit which calculates, as control quantity, a reactive power value to be output by a power regulating apparatus to prevent at least a voltage value deviating from a predetermined voltage range from deviating from a target voltage value; and a notifying unit which notifies the power regulating apparatus of the control quantity. The control quantity calculating unit calculates the control quantity such that the voltage value at a specific voltage measuring point is substantially equal to the target voltage value, and when all of the voltage values deviating from the target voltage value deviate from the target voltage value in a same direction, only positive or negative reactive power is output by power regulating apparatuses.

18 Claims, 16 Drawing Sheets

(51) Int. Cl.
  *G05F 1/70* (2006.01)
  *G06Q 50/06* (2012.01)
  *H02J 3/12* (2006.01)
  *H02J 3/16* (2006.01)
  *H02J 13/00* (2006.01)
  *H02J 3/14* (2006.01)

(52) U.S. Cl.
  CPC .............. *Y04S 40/121* (2013.01); *Y04S 40/124* (2013.01); *Y04S 40/126* (2013.01); *Y10T 307/352* (2015.04)

(56) References Cited

U.S. PATENT DOCUMENTS

| | | | |
|---|---|---|---|
| 4,916,377 A * | 4/1990 | Terada et al. | 323/210 |
| 5,760,492 A * | 6/1998 | Kanoi et al. | 307/18 |
| 6,680,602 B2 * | 1/2004 | Iyoda et al. | 323/207 |
| 8,716,888 B2 * | 5/2014 | Watanabe et al. | 307/42 |
| 8,897,045 B2 * | 11/2014 | Rittiger | 363/137 |
| 2004/0155633 A1 | 8/2004 | Wu et al. | |
| 2011/0187106 A1* | 8/2011 | Ichinose et al. | 290/44 |
| 2013/0057236 A1* | 3/2013 | Hsu et al. | 323/268 |

FOREIGN PATENT DOCUMENTS

| | | |
|---|---|---|
| JP | 6-284582 | 10/1994 |
| JP | 10-320063 | 12/1998 |
| JP | 2003-18748 | 1/2003 |
| JP | 2004-274812 | 9/2004 |
| JP | 2007-288877 | 11/2007 |
| JP | 2007-306744 | 11/2007 |
| JP | 4019150 | 12/2007 |

* cited by examiner

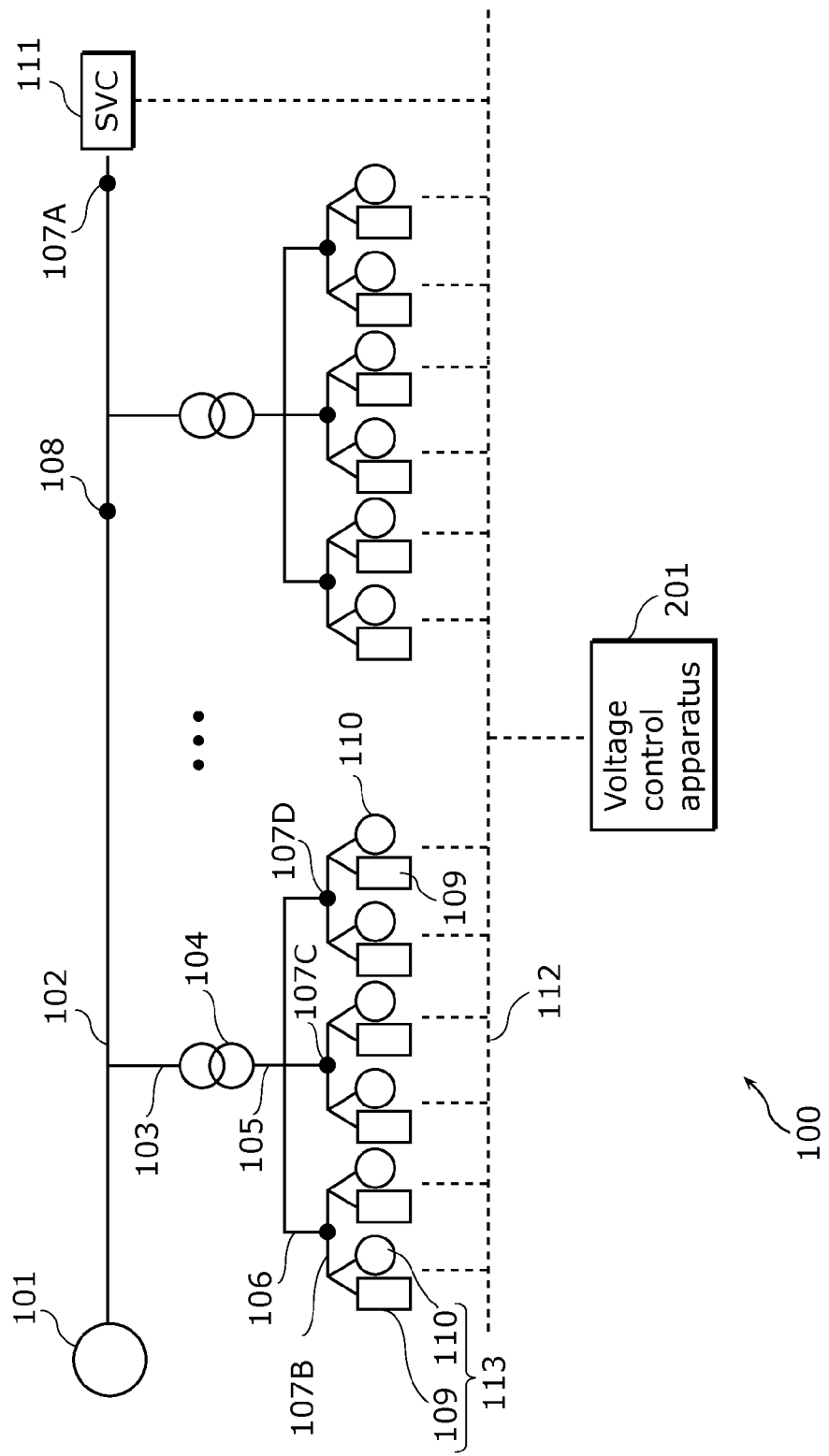

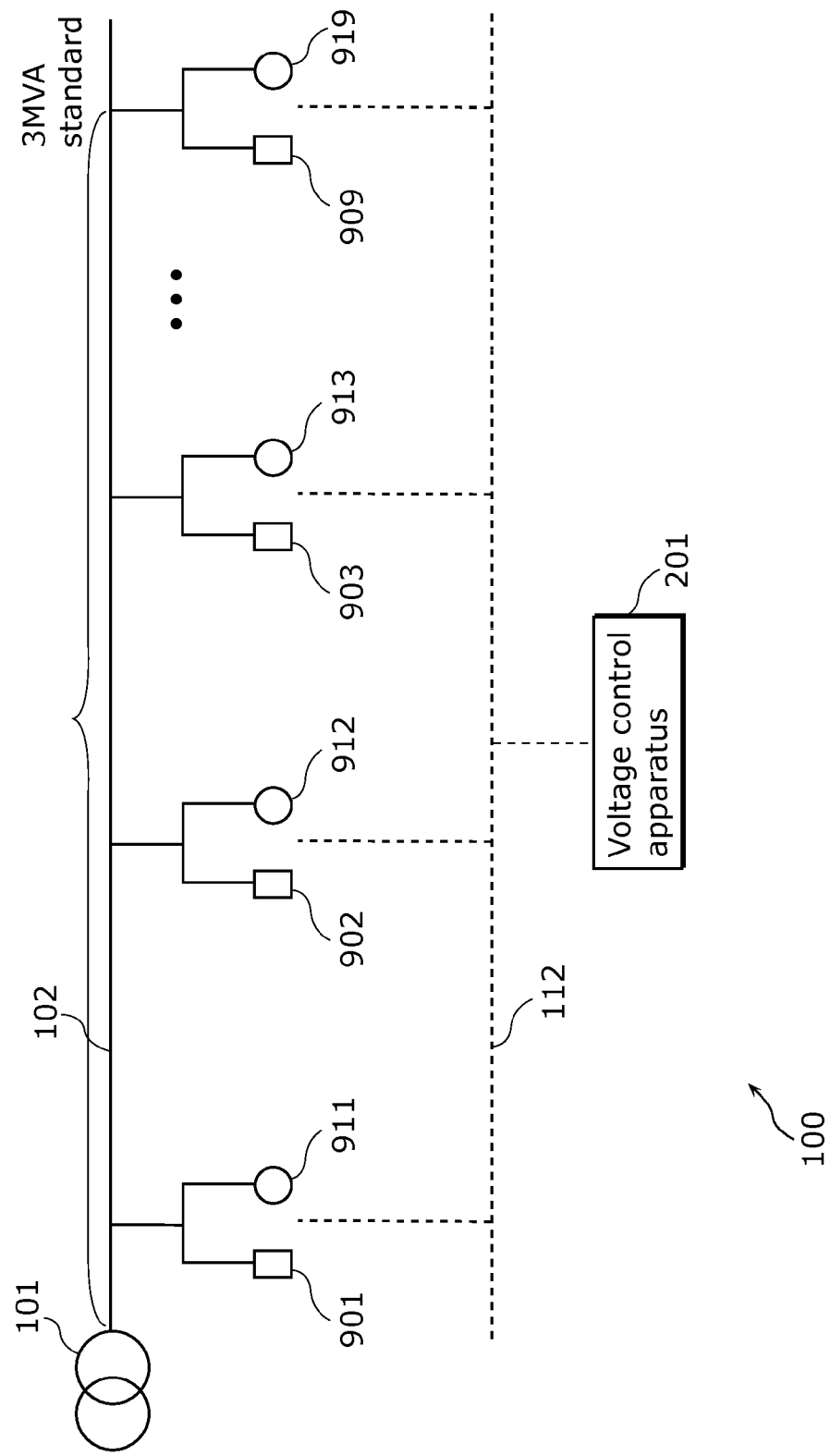

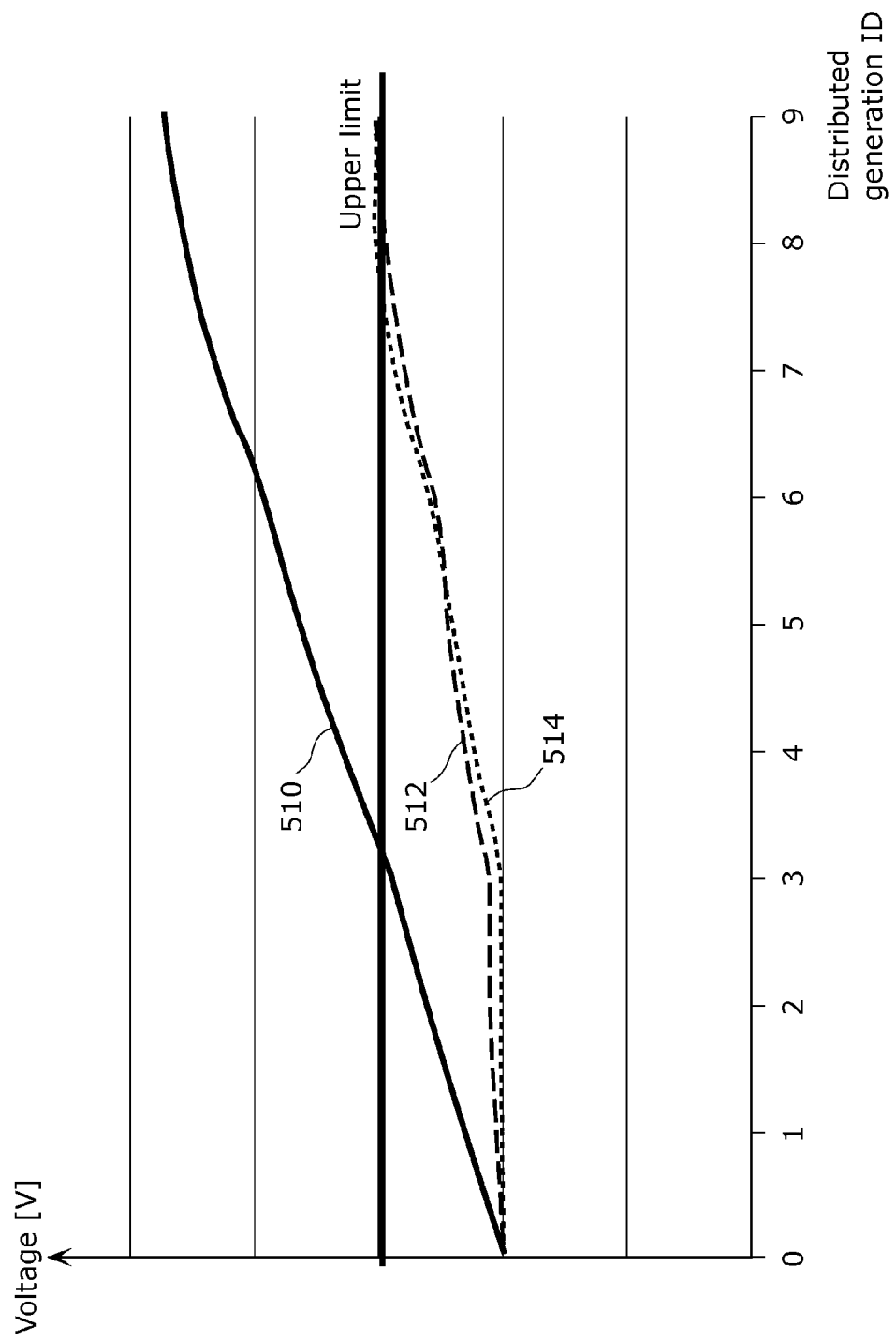

VOLTAGE CONTROL APPARATUS, VOLTAGE CONTROL METHOD, AND POWER REGULATING APPARATUS

CROSS REFERENCE TO RELATED APPLICATION

The present application is based on and claims priority of Japanese Patent Application No. 2011-239719 filed on Oct. 31, 2011, and Japanese Patent Application No. 2012-230932 filed on Oct. 18, 2012. The entire disclosure of the above-identified application, including the specification, drawings and claims is incorporated herein by reference in its entirety.

FIELD

The present disclosure relates to voltage control apparatuses, voltage control methods, power regulating apparatuses, and voltage control programs. In particular, the present disclosure relates to a voltage control apparatus and the like which calculates control quantity for controlling voltage of a distribution system interconnected to distributed generations.

BACKGROUND

In recent years, office buildings and houses have introduced distributed generations, such as solar power generation systems and fuel cell power generation systems. The surplus electric power, remaining after the power generated by the distributed generations is consumed by loads in the houses or buildings, flows back to a distribution system, and is sold to electric power companies. It has been pointed out that if a large number of distributed generations are interconnected to a distribution system in the future, voltage at points of common coupling may deviate from an appropriate voltage range (101±6V, 202±20V) for low-voltage consumers which is defined by a grid-interconnection code, due to backward flow from the distributed generations, simultaneous disconnection of the distributed generations or the like.

In order to prevent voltage from deviating from an appropriate voltage range, there is a known method for controlling voltage at points of common coupling by regulating reactive power to be output by distributed generations. In this method, voltage at connection points is controlled by using, for example, power conditioners included in distributed generations which are capable of regulating reactive power or static var compensators (SVC).

More specifically, distributed generations or SVCs control voltage at connection points by inputting or outputting reactive power according to the line impedance (mainly reactance components) of distribution lines, when the voltage at their own connection points deviate from an appropriate voltage range.

However, when current flowing through distribution lines increases due to an increase of reactive power input or output by distributed generations, SVCs or the like for voltage control, power loss caused in the distribution lines (hereinafter, referred to as distribution loss) also increases, which is a problem.

For example, Patent Literature 1 and Patent Literature 2 disclose techniques for coping with such a problem.

CITATION LIST

Patent Literature

[PTL1] Japanese Patent No. 4019150
[PTL2] Japanese Unexamined Patent Application Publication No. 2003-18748

SUMMARY

Technical Problem

One non-limiting and exemplary embodiment provides a voltage control apparatus and the like which further reduces distribution loss caused when controlling voltage of a distribution system.

Solution to Problem

In one general aspect, the techniques disclosed here feature a voltage control apparatus which controls one or more power regulating apparatuses, each of the one or more power regulating apparatuses outputting, to a distribution system, positive reactive power or negative reactive power for regulating voltage of the distribution system. The voltage control apparatus includes: an obtaining unit which obtains voltage values at one or more voltage measuring points provided in the distribution system; a detecting unit which detects a system impedance value of the distribution system between a substation and each of the one or more power regulating apparatuses; a control quantity calculating unit which, when the one or more voltage measuring points include a voltage measuring point which has a voltage value deviating from a predetermined voltage range, calculates a value as control quantity to prevent at least the voltage value deviating from the predetermined voltage range at the voltage measuring point from deviating from a target voltage value set within the predetermined voltage range, the value calculated as the control quantity corresponding to a value of the reactive power to be output by each of the one or more power regulating apparatuses; and a notifying unit which notifies the one or more power regulating apparatuses of the control quantity calculated by the control quantity calculating unit, in which the control quantity calculating unit performs computation by using the voltage values at the one or more voltage measuring points and the system impedance value to calculate the control quantity such that (i) a voltage value at a specific voltage measuring point is substantially equal to the target voltage value, and (ii) when voltage values at all of voltage measuring points having voltage values deviating from the target voltage value deviate from the target voltage value in a same direction, only the positive reactive power or only the negative reactive power is output by each of the one or more power regulating apparatuses, the specific voltage measuring point being included in the voltage measuring points having the voltage values deviating from the target voltage value.

These general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Furthermore, the present disclosure may also be implemented as a semiconductor integrated circuit (LSI) which achieves part or all of the functions of such a voltage control apparatus, or as a voltage control system which includes such a voltage control apparatus.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure provides a voltage control apparatus and the like which further reduces distribution loss caused when controlling voltage of a distribution system.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a conceptual diagram of a distribution system which includes a voltage control apparatus according to Embodiment 1.

FIG. 9 schematically shows a distribution system used in a simulation.

FIG. 10A shows a result of voltage control performed in the simulation under the conditions shown in FIG. 9.

DESCRIPTION OF EMBODIMENTS

Figure 1A:
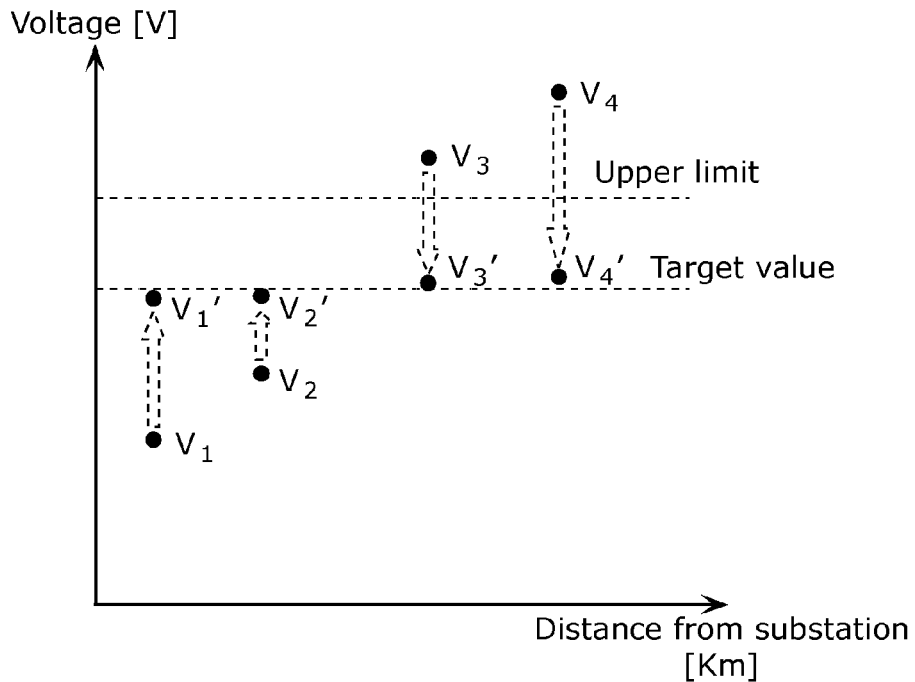
FIG. 1A shows an example of a result of voltage control performed by a voltage control apparatus according to a conventional technique.

Underlying Knowledge Forming Basis of the Present Disclosure

As described in background section, when current flowing through a distribution line increases due to an increase of reactive power input or output by a distributed generation, an SVC or the like for voltage control, power loss caused in the distribution line (hereinafter, referred to as distribution loss) also increases, which is a problem.

In order to cope with such a problem, for example, Patent Literature 1 discloses a technique in which reactive power of distributed generations or a reactive power regulator is calculated so as to minimize the sum of squares of errors between voltage values at respective voltage monitoring points at the secondary of a transformer and the center value of a predetermined voltage range. Furthermore, the tap position of the transformer is determined so as to minimize the calculated sum of squares of reactive power. Accordingly, it is possible to minimize the sum of squares of reactive power output by each distributed generation or a reactive power regulator.

In general, distribution loss occurs when distributed generations output reactive power and also when the distributed generations receive reactive power. Thus, to minimize distribution loss, it is necessary to minimize the sum of the reactive power output by each distributed generation and the reactive power input to each distributed generation.

However, in Patent Literature 1, the value of reactive power to be input or output to or from each distributed generation or the like is determined so as to minimize the sum of squares of deviation from a target voltage value. Here, a tap position is selected from among three possible tap positions such that the sum of squares of reactive power is minimized; however, Patent Literature 1 does not disclose a technique for reducing reactive power itself to be input to or output from each distributed generation or the like.

Patent Literature 2 discloses a technique in which a target voltage value is determined in consideration with tap margin of transformers, reactive power margin in phase modifiers, and margin of reactive power in power generators. Furthermore, Patent Literature 2 disclosure a technique for minimizing the sum of (1) sum of squares of deviation between the determined target voltage value and the current voltage value and (2) sum of squares of deviation between the target value of reactive power flow and the current value of reactive power flow. According to PTL 2, the technique allows the reactive power flow at monitoring points to approximate to a target value.

In this case, too, a relationship between a term related to voltage and a term related to reactive power is a trade-off. As a result, the input or output reactive power will not always be the minimum value.

In order to solve the problems, an aspect of the voltage control apparatus disclosed here controls one or more power regulating apparatuses, each of the one or more power regulating apparatuses outputting, to a distribution system, positive reactive power or negative reactive power for regulating voltage of the distribution system. The voltage control apparatus includes: an obtaining unit which obtains voltage values at one or more voltage measuring points provided in the distribution system; a detecting unit which detects a system impedance value of the distribution system between a substation and each of the one or more power regulating apparatuses; a control quantity calculating unit which, when the one or more voltage measuring points include a voltage measuring point which has a voltage value deviating from a predetermined voltage range, calculates a value as control quantity to prevent at least the voltage value deviating from the predetermined voltage range at the voltage measuring point from deviating from a target voltage value set within the predetermined voltage range, the value calculated as the control quantity corresponding to a value of the reactive power to be output by each of the one or more power regulating apparatuses; and a notifying unit which notifies the one or more power regulating apparatuses of the control quantity calculated by the control quantity calculating unit, in which the control quantity calculating unit performs computation by using the voltage values at the one or more voltage measuring points and the system impedance value to calculate the control quantity such that (i) a voltage value at a specific voltage measuring point is substantially equal to the target voltage value, and (ii) when voltage values at all of voltage measuring points having voltage values deviating from the target voltage value deviate from the target voltage value in a same direction, only the positive reactive power or only the negative reactive power is output by each of the one or more power regulating apparatuses, the specific voltage measuring point being included in the voltage measuring points having the voltage values deviating from the target voltage value.

With such a structure, the voltage control apparatus is capable of further reducing the sum of the positive or negative reactive power output by the power regulating apparatuses, compared to a conventional technique. As a result, the voltage control apparatus is capable of further reducing distribution loss caused when controlling voltage of a distribution system.

Furthermore, it may be that the one or more power regulating apparatuses includes a plurality of power regulating apparatuses interconnected to the distribution system, and when the one or more voltage measuring points includes a voltage measuring point having a voltage value deviating from the predetermined voltage range, the control quantity calculating unit calculates the control quantity for each of the power regulating apparatuses to assign the value of the reactive power to be output by each of the power regulating apparatuses according to a line resistance value of the system impedance value.

With this, the voltage control apparatus assigns the reactive power values to be output by the respective power regulating apparatuses, according to the system impedances. As a result, the voltage control apparatus is capable of further reducing distribution loss.

Furthermore, it may be that wherein the one or more power regulating apparatuses includes a plurality of power regulating apparatuses interconnected to the distribution system, and when the one or more voltage measuring points includes a voltage measuring point having a voltage value deviating from the predetermined voltage range, the control quantity calculating unit calculates the control quantity for each of the power regulating apparatuses to assign the value of the reactive power to be input or output by each of the power regulating apparatuses according to power loss caused within the power regulating apparatus when the power regulating apparatus outputs the reactive power.

Such a structure allows reduction of power loss caused not only in distribution lines but also within the power regulating apparatuses.

Furthermore, it may be that the obtaining unit further obtains the value of the reactive power output by each of the one or more power regulating apparatuses, when the one or more voltage measuring points include a voltage measuring point having a voltage value deviating from the predetermined voltage range at current time t, the control quantity calculating unit compares, with a predetermined value, an absolute value of a difference between (i) the value of the reactive power obtained by the obtaining unit at the current time t, and (ii) a first reactive power value calculated at time t−1 as the value of the reactive power to be output by each of the one or more power regulating apparatuses, when the absolute value of the difference is greater than the predetermined value, the control quantity calculating unit calculates, as the control quantity, a value of sum of (i) the value of the reactive power calculated at the current time t, and (ii) the value of the reactive power obtained by the obtaining unit at the current time t, and when the predetermined value is greater than the absolute value of the difference, the control quantity calculating unit calculates, as the control quantity, a value of sum of (i) the value of the reactive power calculated at the current time t, and (ii) the first reactive power value.

In general, there is a time lag between the time at which a power regulating apparatus receives a command from the voltage control apparatus and the time at which the voltage regulating apparatus outputs reactive power according to the command value, due to rise time. In this case, when the control cycle is less than the rise time of the power regulating apparatus, incorrect control quantity is calculated, resulting in a failure in control. The voltage control apparatus having the above structure avoids such a failure.

Furthermore, it may be that the obtaining unit further obtains the value of the reactive power output by each of the one or more power regulating apparatuses, when the one or more voltage measuring points include a voltage measuring point having a voltage value deviating from the predetermined voltage range at current time t, the control quantity calculating unit compares, with a predetermined value, an absolute value of a difference between (i) the value of the reactive power obtained by the obtaining unit at the current time t, and (ii) a first reactive power value calculated at time t−1 as the value of the reactive power to be output by each of the one or more power regulating apparatuses, when the absolute value of the difference is greater than the predetermined value, the control quantity calculating unit calculates the first reactive power value as the control quantity, and when the predetermined value is greater than the absolute value of the difference, the control quantity calculating unit calculates, as the control quantity, a value of sum of (i) the value of the reactive power calculated at the current time t, and (ii) the first reactive power value.

With this, it is possible to avoid calculating incorrect control quantity due to measurement errors of voltage values, by not using measurement values of reactive power output by power regulating apparatuses for calculation of control quantity performed by the control quantity calculating unit.

Furthermore, it may be that when the one or more voltage measuring points include a plurality of voltage measuring points having voltage values deviating from the predetermined voltage range, and when all of the voltage values deviating from the predetermined voltage range at the voltage measuring points deviate from the target voltage value in a same direction, the control quantity calculating unit (i) identifies, as the specific voltage measuring point, a voltage measuring point having a largest voltage deviation amount among the voltage measuring points having the voltage values deviating from the predetermined voltage range, and (ii) calculates the control quantity such that the voltage value at the specific voltage measuring point is substantially equal to the target voltage value.

With this, in a case where voltage values are above or below a predetermined range, the control quantity calculating unit is capable of determining a specific voltage measuring point which allows further reduction of reactive power to be input or output.

Furthermore, it may be that when (i) the one or more voltage measuring points include a plurality of voltage measuring points having voltage values deviating from the predetermined voltage range, (ii) the predetermined voltage range includes a first target voltage value and a second target voltage value that is smaller than or equal to the first target voltage value, and (iii) at least one of the voltage values at the voltage measuring points is above the first target voltage value and at least one of the voltage values at the voltage measuring points is below the second target voltage value, the control quantity calculating unit (i) identifies, as a first specific point, a voltage measuring point having a largest voltage deviation amount among the voltage measuring points having the voltage values above the first target voltage value, (ii) identifies, as a second specific point, a voltage measuring point having a largest voltage deviation amount among the voltage measuring points having the voltage values below the second target voltage value, and (iii) calculates the control quantity such that the voltage value at the first specific point is substantially equal to the first target voltage value and the voltage value at the second specific point is substantially equal to the second target voltage value.

With this, in a case where at least one of the voltage values is above a predetermined range and at least one of the voltage values is below the predetermined range, the control quantity calculating unit is capable of determining a specific voltage measuring point which allows further reduction of reactive power to be input or output.

Furthermore, it may be that when at least one of the one or more power regulating apparatuses is a distributed generation, the obtaining unit is further configured to obtain a value of reactive power and a value of active power that are output by the distributed generation.

Furthermore, it may be that the distributed generation includes a plurality of distributed generations, the control quantity calculating unit calculates a power factor of each of the distributed generations from the values of the reactive power and the active power which are output by the distributed generation and which are obtained by the obtaining unit, and when the power factor is smaller than a predetermined value, the control quantity calculating unit calculates, as the control quantity, an active power suppression value and a reactive power reduction value such that the power factor approximates to the predetermined value, the active power suppression value indicating a value of the active power to be suppressed, and the reactive power reduction value indicating a value of the reactive power to be reduced.

With this, the voltage control apparatus is capable of regulating the values of active power and reactive power to be output such that the power factor falls within an appropriate range.

Furthermore, it may be that when the control quantity calculating unit regularly notifies the one or more regulating apparatuses of the control quantity via the notifying unit, the control quantity calculating unit calculates the control quantity in a shorter cycle as voltage variation at the one or more voltage measuring points increases, and notify the one or more regulating apparatuses of the calculated control quantity.

With this, the smaller the variation is, the longer the control cycle becomes. As a result, it is possible to reduce unnecessary control performed by the voltage control apparatus.

Furthermore, it may be that the control quantity calculating unit calculates, as the control quantity at current time t, an average value of all of control quantities calculated in a predetermined period from the current time t to time t−m, or an average value of largest control quantity and smallest control quantity among the control quantities calculated in the predetermined period.

With this, the control quantity calculating unit can prevent control from dispersing, by allowing reactive power to be input or output gradually, instead of making the reactive power to be input or output follow rapid voltage variation.

Furthermore, it may be that the obtaining unit obtains the value of the reactive power output by each of the one or more power regulating apparatuses, and when none of the voltage values measured at the one or more voltage measuring points deviates from the predetermined voltage range, and when at least one of the one or more power regulating apparatuses outputs the reactive power, the control quantity calculating unit calculates a value of reactive power to be subsequently output by each of the at least one of the one or more power regulating apparatuses, by multiplying the reactive power value output by the at least one of the one or more power regulating apparatuses with an input and output reduction coefficient.

With this, it is possible to avoid unnecessary input or output of reactive power, by reducing input or output of the reactive power when voltage is stable.

Furthermore, the control quantity calculating unit sets the value of the input and output reduction coefficient to be closer to 1, as voltage variation at the one or more voltage measuring points increases, and sets the value of the input and output reduction coefficient to be closer to 0 as the voltage variation at the one or more voltage measuring points decreases.

In general, quantity of reactive power that can be input or output instantaneously by power regulating apparatuses is limited; and thus, excessive reduction of input or output of the reactive power does not allow appropriate response to rapid voltage variation. However, according to the structure above, the value of an input and output reduction coefficient is determined according to the magnitude of voltage variation. Hence, for example, even in a case where voltage rapidly varies while reducing the output of the reactive power, an input or output of the reactive power can be increased promptly.

Furthermore, it may be that the distribution system is connected to an automatic step voltage regulator which regulates secondary voltage of a transformer, the obtaining unit further obtains (i) a tap range indicating a range of transformation performed by the automatic step voltage regulator, and (ii) a tap position and tap-to-tap voltage which indicate a state of current transformation performed by the automatic step voltage regulator, and the control quantity calculating unit further calculates, as the control quantity, the tap position in the automatic step voltage regulator.

With the structure above, output of the reactive power is reduced by controlling a tap that is an automatic step-voltage regulator, thereby reducing distribution loss.

According to an aspect of the present disclosure, the power regulating apparatus outputs, to a distribution system, positive reactive power or negative reactive power for regulating voltage of the distribution system. The power regulating apparatus includes: a terminal information obtaining unit which obtains a value of the reactive power output by the power regulating apparatus and a voltage value at a point of common coupling; a communicating unit which (i) transmits, to a voltage control apparatus, the value of the reactive power and the voltage value at the point of common coupling that are obtained by the terminal information obtaining unit, and (ii) receives, from the voltage control apparatus, control quantity that is a value corresponding to the value of the reactive power to be output by the power regulating apparatus; and an output control unit which controls the value of the reactive power output by the power regulating apparatus, wherein, when the voltage value at the point of common coupling obtained by the terminal information obtaining unit deviates from the predetermined voltage range, the output control unit outputs the reactive power such that the voltage value at the point of common coupling falls within the predetermined voltage range, after the voltage value at the point of common coupling falls within the predetermined voltage range, the communicating unit transmits, to the voltage control apparatus, the value of the reactive power obtained by the terminal information obtaining unit and the voltage value at the point of common coupling, and after the communicating unit receives the control quantity from the voltage control apparatus, the output control unit controls the value of the reactive power according to the received control quantity.

With the above structure, the power regulating apparatuses perform autonomously initial power control, thereby eliminating control delay. As a result, it is possible to reduce the time period required for voltage to stabilize after deviating from the appropriate range.

Hereinafter, certain exemplary embodiments are described in greater detail with reference to the accompanying Drawings. Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the scope of the present disclosure. Among the structural elements in the following exemplary embodiments, structural elements not recited in any one of the independent claims are described as arbitrary structural elements.

Figure 1B:
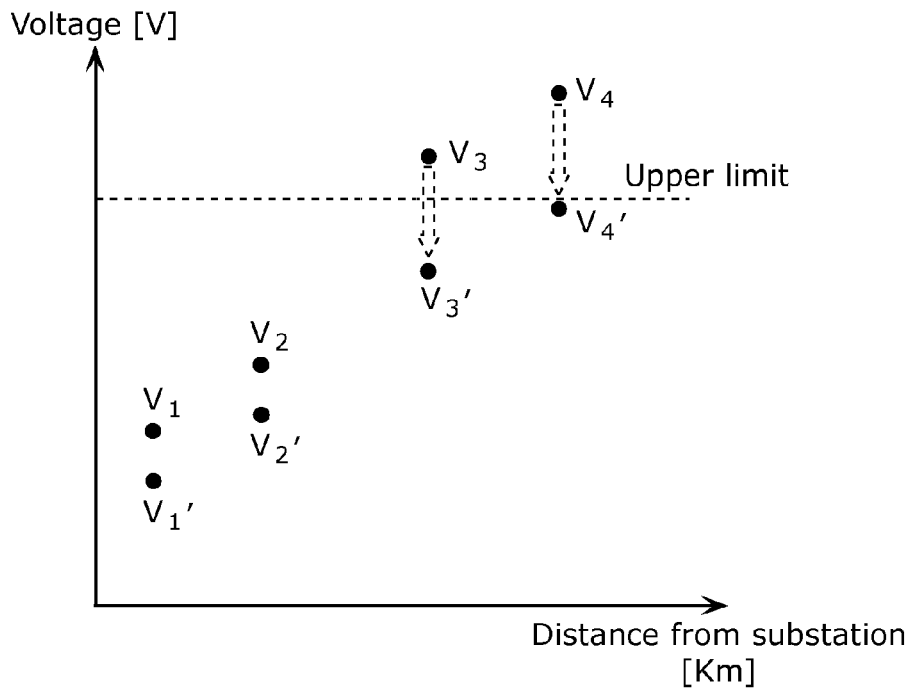
FIG. 1B shows an example of a result of voltage control performed by a voltage control apparatus according to the present disclosure.

First, referring to FIG. 1A and FIG. 1B, more detailed descriptions are given of problems to be solved by the present disclosure, and advantageous effects of the present disclosure.

FIG. 1A shows an example of a result of voltage control performed by a voltage control apparatus according to a conventional technique.

In FIG. 1A, it is assumed that the voltage control apparatus according to the conventional technique controls voltage $V_1$ to $V_4$ measured at given time t at voltage measuring points each having a different distance from a substation, such that $V_1$ to $V_4$ are equal to or less than the upper limit. As shown in FIG. 1A, voltage $V_3$ and $V_4$ are above the upper limit.

The voltage control apparatus controls voltage at voltage measuring points by controlling power regulating apparatuses capable of receiving or outputting reactive power. Examples of the power regulating apparatuses include a distributed generation and an SVC. The reactive power may be leading reactive power or lagging reactive power. For explanation purposes, hereinafter, the reactive power refers to leading reactive power. Furthermore, descriptions are given under an assumption that the direction of output of the leading reactive power is positive. In other words, "a power regulating apparatus outputs negative reactive power" means that the power regulating apparatus receives reactive power.

In this case, the voltage control apparatus is capable of decreasing voltage at a voltage measuring point on a distribution network interconnected to the power regulating apparatus, by causing the power regulating apparatus to output positive reactive power. Furthermore, by causing the power regulating apparatus to output negative reactive power, it is possible to increase the voltage at the voltage measuring point.

More specifically, the voltage control apparatus according to the conventional technique determines the values of the reactive power to be output by the power regulating apparatuses so as to minimize the sum of squares of deviation values between a target value set as a predetermined value lower than or equal to the upper limit and each of voltage $V_1$ to $V_4$. In other words, the values of the reactive power are determined by a least-square method.

As a result, with respect to $V_1$ and $V_2$ lower than the target value, the values of the reactive power are determined so as to obtain higher voltage $V_1'$ and $V_2'$. Furthermore, with respect to $V_3$ and $V_4$ higher than the target value, the values of the reactive power are determined so as to obtain lower voltage $V_3'$ and $V_4'$.

In such a manner, in the conventional technique, the least-square method is used for determining the values of the reactive power to be output, because algebraical methods cannot generally determine the values of the reactive power.

For example, where n represents the number of power regulating apparatuses, and m represents the number of voltage measuring points, in general, the relation of m=n has to be satisfied to obtain a solution to a system of equations having the values of the reactive power to be output by the power regulating apparatuses as unknown.

Hence, the conventional technique determines the values of the reactive power to be output by setting the center value (average value, medium value or the like) of voltage $V_1$ to $V_4$ to a target value, and making the voltage at the voltage measuring points to approximate to the target value as a whole so as to prevent the voltage at the voltage measuring points from deviating from the upper limit or the lower limit.

FIG. 1B shows an example of a result of voltage control performed by a voltage control apparatus according to the present disclosure.

The voltage control apparatus according to the present disclosure defines an objective function so as to minimize distribution loss, as described later. The objective function is solved by non-linear programming with a constraint based on the target voltage value. As a result, it is possible to control only the voltage deviating from the upper limit or the lower limit at the voltage measuring points. More specifically, in FIG. 1B, control is performed such that only voltage $V_3$ and $V_4$ deviating from the upper limit at time t are decreased to voltage $V_3'$ and $V_4'$ that are below the upper limit. Note that the voltage $V_1$ and $V_2$ are not controlled intentionally, but are respectively dropped to $V_1^1$ and $V_2'$ in some degree due to influence of the control of the voltage $V_3$ and $V_4$.

Comparison between FIG. 1A and FIG. 1B shows that the voltage $V_1'$ to $V_4'$ after control are suppressed below the upper limit in both cases. However, in FIG. 1A, the voltage $V_1'$ and $V_2'$ are resultant from an increase of $V_1$ and $V_2$ respectively, and $V_3'$ and $V_4'$ are resultant from a decrease of $V_3$ and $V_4$, respectively. This means that positive reactive power is output for controlling $V_3$ and $V_4$, and negative reactive power is output for controlling $V_1$ and $V_2$.

On the other hand, in FIG. 1B, only voltage $V_3$ and $V_4$ are decreased to voltage $V_3'$ and $V_4'$. This means that only positive reactive power is output for controlling $V_3$ and $V_4$.

In general, output of reactive power causes distribution loss in a distribution system regardless of whether the reactive power is in a positive or negative state. Thus, to minimize distribution loss, it is necessary to minimize the absolute value of reactive power to be output for voltage control or the sum of squares of the reactive power. Here, in FIG. 1A and FIG. 1B, it is apparent that the control for decreasing the voltage $V_3$ and $V_4$ that are above the upper limit can reduce the absolute value of the reactive power or the sum of squares of the reactive power more than the control for increasing the voltage $V_1$ and $V_2$ and decreasing the voltage $V_3$ and $V_4$.

According to the present disclosure, to minimize distribution loss caused in a distribution system, it is possible to achieve a voltage control apparatus which performs voltage control with minimum necessary reactive power as shown in FIG. 1B, instead of performing control with unnecessary control as shown in FIG. 1A.

Hereinafter, more detailed descriptions are given.

Embodiment 1

FIG. 2 is a conceptual diagram of a distribution system 100 which includes a voltage control apparatus 201 according to Embodiment 1.

As shown in FIG. 2, the distribution system 100 includes a distribution substation 101, a high-voltage distribution line 102, high-voltage drop wires 103, pole-mounted transformers 104, low-voltage distribution lines 105, service wires 106, points of common coupling 107A to 107D, a measurement point 108, loads 109, distributed generations 110, an SVC 111, communication lines 112, and the voltage control apparatus 201. In FIG. 2, moving from left to right means the distance from the distribution substation 101 becomes farther.

The high-voltage distribution line 102 is interconnected to a plurality of high-voltage drop wires 103. The voltage of the power fed trough the high-voltage drop wire 103 is dropped by the pole-mounted transformer 104, and the power is distributed to each consumer 113 via the low-voltage distribution line 105 and the service wire 106.

In FIG. 2, each consumer 113 includes a load 109 and a distributed generation 110.

The points of common coupling are connection points at which the SVC 111 or the respective consumers 113 are connected to the distribution system. More specifically, the point of common coupling 107A is a point at which the SVC 111 is connected to the distribution system. The points of common coupling 107B to 107D are points at which the respective consumers 113 are connected to the distribution system.

The measurement point 108 is a point at which voltage other than the points of common coupling 107A to 107D in the distribution system is measured.

The points of common coupling 107A to 107D, and the measurement point 108 that is a point other than the points of common coupling 107A to 107D in the distribution system 100 are examples of the voltage measuring points.

The loads 109 are loads at the respective consumers 113.

Each of the distributed generations 110 is, for example, a distributed generation system such as a solar power generation system or a fuel cell system, or a distributed electrical energy storage system such as a rechargeable battery energy storage system each of which is provided at each consumer 113. The distributed generation 110, for example, includes: a power generator such as a solar cell or a fuel cell, or a storage device such as a secondary cell; and a power conditioner which performs DC/AC conversion on DC power generated by the power generator or the storage device.

The distributed generation 110 controls the magnitude of voltage at one or more voltage measuring points by outputting positive or negative reactive power to the distribution system. Under the current grid-interconnection code, output of the negative reactive power by distributed generations is prohibited; however, in the present disclosure, it is assumed that the negative reactive power may also be output.

The SVC 111 also controls the magnitude of voltage at one or more voltage measuring points by outputting positive or negative reactive power to the distribution system.

The distributed generations 110 and the SVC 111 are examples of the power regulating apparatus. In other words, the power regulating apparatuses output positive or negative reactive power to the distribution system for regulating voltage of the distribution system.

The voltage control apparatus 201 is a control apparatus which controls one or more power regulating apparatuses such that voltage at the voltage measuring points fall within a proper range.

Figure 3:
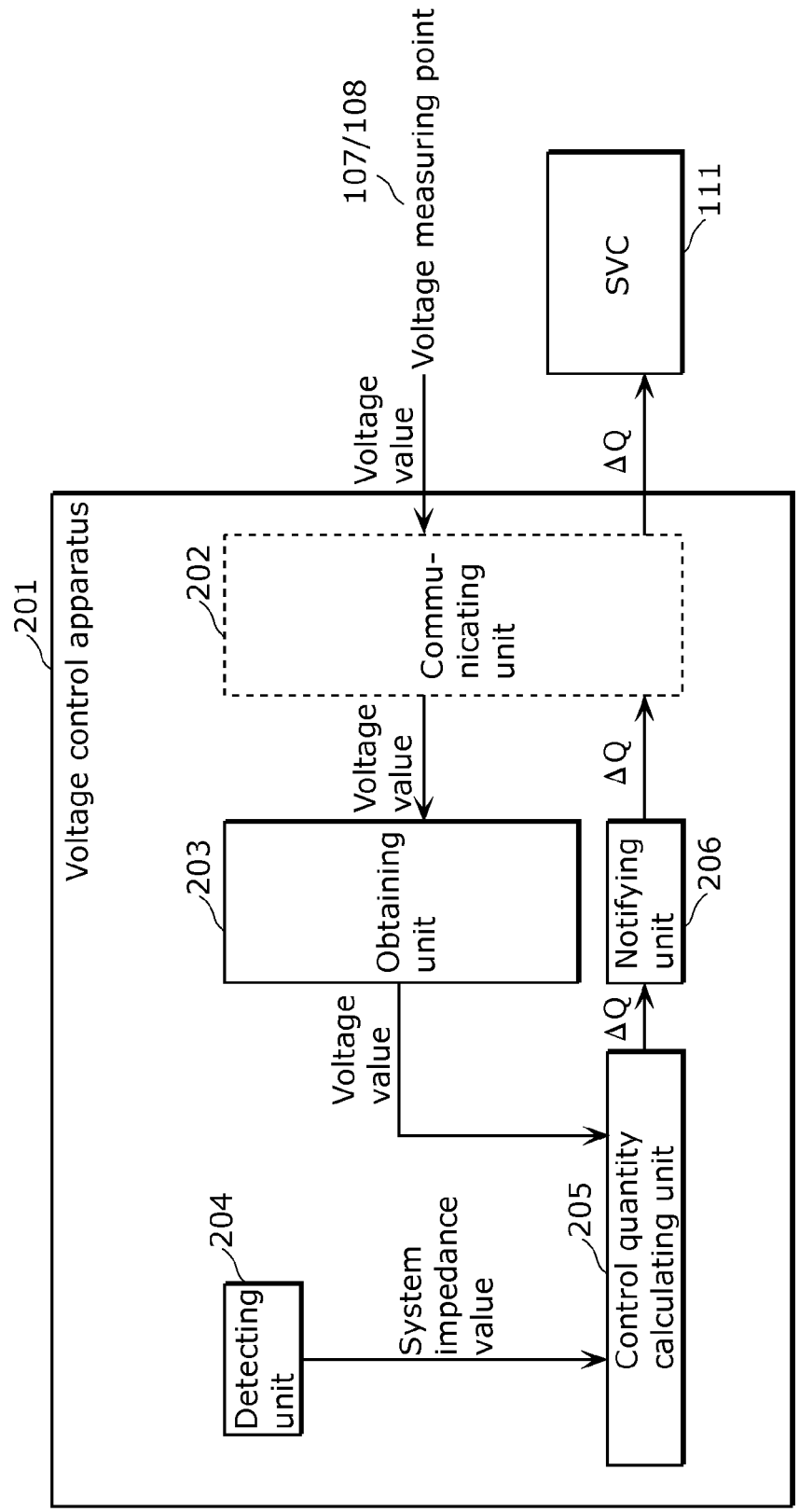
FIG. 3 is a functional block diagram of the voltage control apparatus according to Embodiment 1.
Figure 4:
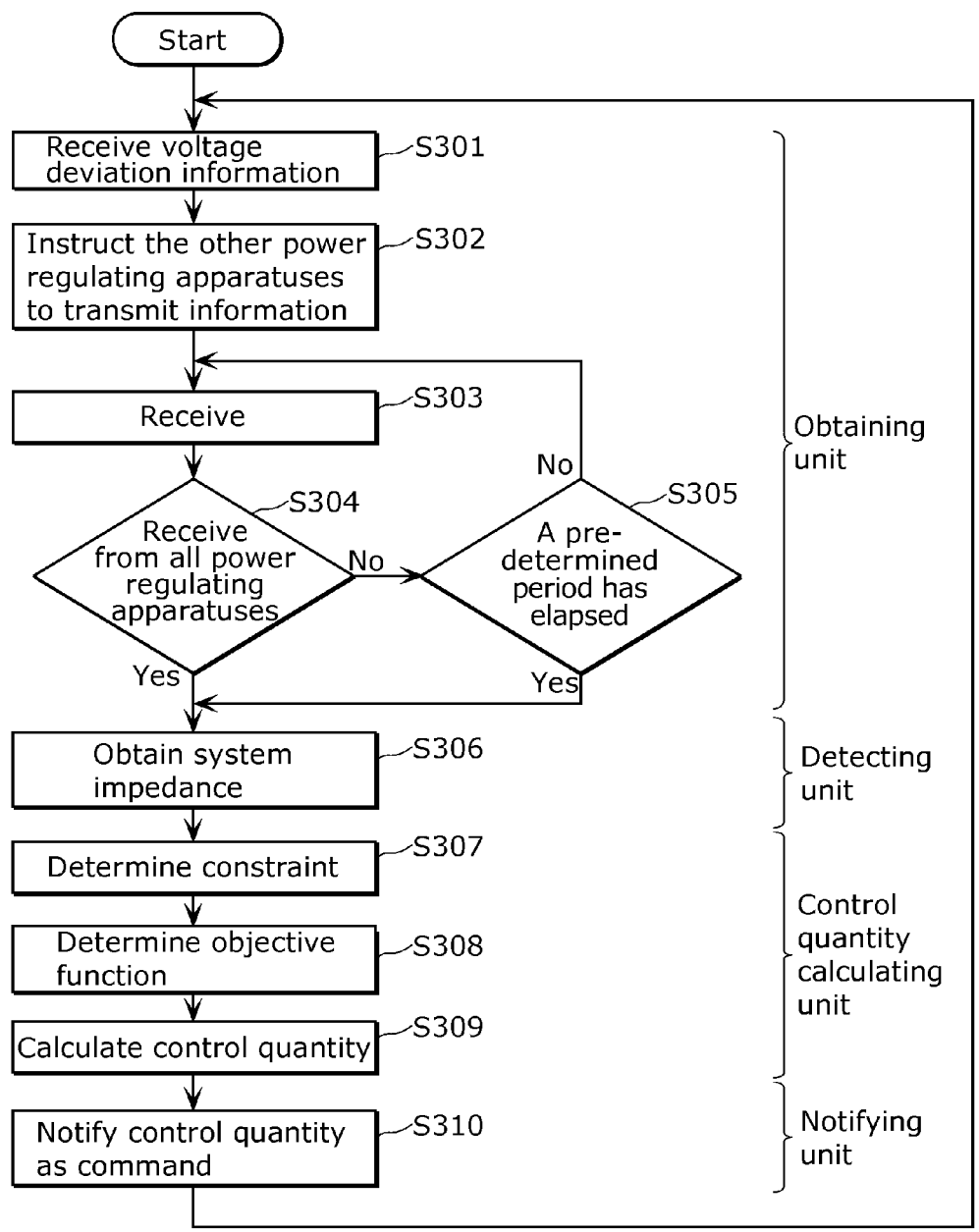
FIG. 4 is a flowchart of an example of processing performed by the voltage control apparatus according to Embodiment 1.

Next, referring to FIG. 3 and FIG. 4, more detailed descriptions are given of the voltage control apparatus 201.

FIG. 3 shows functional blocks of the voltage control apparatus 201 according to Embodiment 1.

As shown in FIG. 3, the voltage control apparatus 201 includes a communicating unit 202, an obtaining unit 203, a detecting unit 204, a control quantity calculating unit 205 and a notifying unit 206.

The communicating unit 202 is a communication interface for communicating with the voltage measuring points and the SVC 111 via the communication lines 112 shown in FIG. 2. Any communication interface can be used for the communicating unit 202. For example, power line communication (PLC), or 950 MHz band wireless communication may be used.

The communicating unit 202 obtains the voltage values measured at one or more voltage measuring points and outputs the obtained values to the obtaining unit 203.

The obtaining unit 203 obtains, from the communicating unit 202, the voltage values at one or more voltage measuring points provided in the distribution system.

The detecting unit 204 detects the system impedance value of the distribution system between the distribution substation 101 and a power regulating apparatus. In a case where multiple power regulating apparatuses exist, the detecting unit 204 detects the system impedance value between the distribution substation 101 and each power regulating apparatus.

The control quantity calculating unit 205 obtains, from the obtaining unit 203, the voltage values at the respective voltage measuring points. The control quantity calculating unit 205 also obtains, from the detecting unit 204, the system impedance values. In a case where one or more voltage measuring points includes a voltage measuring point which has a voltage value deviating from a predetermined voltage range, the control quantity calculating unit 205 calculates, as control quantity, a value corresponding to the reactive power value to be output by each of one or more power regulating apparatuses, such that at least the voltage value deviating from the predetermined voltage range at the voltage measuring point does not deviate from a target voltage value set within the predetermined voltage range.

Here, the predetermined voltage range refers to, for example, an appropriate voltage range for low voltage consumers (101±6V, 202±20V) defined by a grid-interconnection code in Japan.

Examples of the target voltage value include the center value, the upper limit, or the lower limit of a predetermined voltage range, an average value of voltage values at all of the voltage measuring points, and an average value of the voltage values at the voltage measuring points that are within a predetermined voltage range.

More specifically, the control quantity calculating unit 205 performs computation using the voltage values at one or more voltage measuring points and the system impedance values to calculate control quantity such that the voltage value at a specific voltage measuring point, among the voltage measuring points having voltage values deviating from the target voltage value, substantially equals the target voltage value. Furthermore, in a case where the voltage values at all of the voltage measuring points having voltage values deviating from the target voltage value, deviate from the target voltage value in a same direction, the control quantity calculating unit 205 calculates control quantity such that only the positive reactive power or only the negative reactive power is output by the one or more power regulating apparatuses.

Furthermore, in a case where multiple power regulating apparatuses are interconnected to the distribution system 100, and where one or more voltage measuring points include a voltage measuring point having a voltage value deviating from a predetermined voltage range, the control quantity calculating unit 205 may calculate control quantity for each of the power regulating apparatuses such that the reactive power value to be output by the power regulating apparatus is assigned according to a line resistance value of the system impedance value. For considering distribution loss, distribution loss is expressed by a product of the square of current I and resistance R in a distribution line ($I^2 \times R$). In particular, focusing on reactive power Q, distribution loss is expressed by $(Q/V)^2 \times R$, where Q denotes reactive power, V denotes voltage, and R denotes resistance in a distribution line.

Hence, to reduce distribution loss, it is necessary not only to decrease current I (reactive power Q) flowing through the distribution line, but also to consider the resistance R of the distribution line through which the current I (reactive power Q) flows. According to the structure above, distribution loss can be further reduced because each power regulating apparatus is controlled according to the system impedance value that is the resistance of the distribution line.

More specifically, the control quantity is calculated by the control quantity calculating unit 205 solving an optimization problem of an objective function by non-linear programming with a constraint based on the target voltage value.

For example, referring back to FIG. 1B, it is assumed that the voltage measuring point, at which $V_4'$ having a largest deviation amount is measured, is a specific voltage measuring point and the upper limit is a target voltage value. Here, the voltage values which deviate from the target voltage value are only $V_3$ and $V_4$. Both of $V_3$ and $V_4$ are above the target voltage value. In this case, the voltage control apparatus 201 calculates control quantity such that only positive reactive power or only negative reactive power is output by the power regulating apparatuses and that $V_4'$ is substantially equal to the target voltage value. In other words, the voltage control apparatus 201 calculates control quantity such that the voltage to be controlled among $V_1$ to $V_4$ is controlled into a same direction and that $V_4'$ is substantially equal to the target voltage value.

As a result, the voltage control apparatus 201 calculates control quantity such that $V_3$ and $V_4$ are dropped to $V_3'$ and $V_4'$, respectively. Detailed descriptions of calculation will be given later.

In the related technology shown in FIG. 1A, although, at all of the voltage measuring points having voltage values deviating from the target voltage value, the voltage values deviate from the target voltage value in a same direction, at least one of the power regulating apparatuses outputs positive reactive power or negative reactive power that is different from the others. The voltage control apparatus 201 can avoid this.

As described above, in a case where, at all of the voltage measuring points having voltage values deviating from the target voltage value, the voltage values deviate from the target voltage value in a same direction, if control is performed in which at least one of the power regulating apparatuses is caused to output positive reactive power or negative reactive power that is different from the others, distribution loss in the distribution system increases. On the other hand, the control quantity calculating unit 205 calculates control quantity such that only positive reactive power or only negative reactive power is output. Thus, the control quantity calculating unit 205 can further reduce distribution loss caused at the time of voltage control of the distribution system.

The notifying unit 206 notifies one or more power regulating apparatuses of the control quantity calculated by the control quantity calculating unit 205. More specifically, the control quantity notified by the notifying unit 206 specifically refers to variation $\Delta Q$ of the reactive power to be output by the SVC 111.

FIG. 4 is a flowchart of an example of processing performed by the voltage control apparatus 201.

First, upon receipt of voltage deviation information from the communicating unit 202 (S301), the obtaining unit 203 instructs, via the communicating unit 202, all of the other power regulating apparatuses to transmit the current voltage values at the voltage measuring points (S302).

Here, the voltage deviation information refers to information which indicates that the voltage value at a voltage measuring point measured by a power regulating apparatus deviates from a predetermined voltage range. Examples of the voltage deviation information include voltage values, deviation values (the difference between the voltage value and the upper limit or the lower limit of a predetermined voltage range). The obtaining unit 203 may determine whether or not the obtained voltage value is out of a predetermined voltage range, and generate voltage deviation information.

Next, the obtaining unit 203 waits for the voltage values transmitted from the power regulating apparatuses. Upon receipt of the voltage values from the power regulating apparatuses (S303), the obtaining unit 203 determines whether or not the voltage values have been received from all of the power regulating apparatuses interconnected to the distribution system (S304). Here, if the obtaining unit has not received the voltage values from any of the power regulating apparatuses (No in S304), the obtaining unit 203 keeps waiting for the voltage values to be transmitted if a predetermined period has not elapsed (No in S305) from the time at which the instruction for transmitting the voltage value was made in Step S302.

On the other hand, in a case where the obtaining unit 203 has received the voltage values from all of the power regulating apparatuses (Yes in S304), or where a predetermined period has elapsed from Step S302 (Yes in S305), the detecting unit 204 obtains the system impedances (S306). It is to be noted that when there is no change in the configuration of the distribution system 100, it is understood that there is no significant change in the system impedances while the voltage control apparatuses 201 are operating. Thus, for example, the system impedances may be obtained only once immediately before Step S301. Furthermore, it may be that a read only memory (ROM) or the like included in the voltage control apparatus 201 stores predetermined system impedances, and the detecting unit 204 reads the values thereof.

Next, the control quantity calculating unit 205 determines one or more constraints according to a method described later (S307). The control quantity calculating unit 205 further determines an objective function (S308).

After that, the control quantity calculating unit 205 calculates control quantity for each of the power regulating apparatuses by solving an optimization problem of the objective function by non-linear programming with the calculated constraint (S309).

The notifying unit 206 then notifies each power regulating apparatus of the calculated control quantity (S310).

Now, descriptions are given of algorithms used by the control quantity calculating unit 205 for determining the constraints and the objective functions in Step S307 and Step S308.

The control quantity calculating unit 205 solves an optimization problem for minimizing distribution loss by non-linear programming method with constraints such as decreasing voltage to be lower than or equal to the target voltage value or increasing voltage to be higher than or equal to the target voltage value.

Here, the objective function is determined as the following expression (1).

[Expression 1]

$$\sum_{i=1}^{n} \left( \frac{\sum_{j=1}^{n} (Q_j + \Delta Q_j)}{V_i} \right)^2 \times R_i \to \min \quad \text{Expression (1)}$$

Furthermore, the constraints are determined as the following expression (2). Assumed that a distributed generation and a SVC are connected to the distribution system as power regulating apparatuses.

[Expression 2]

$$-\sum_{i}^{n} \frac{Q_i(R_k^2 + X_k^2) + X_k V_h^2}{V_h(2(X_k Q_i + R_k P_i) + V_h^2)} \cdot \Delta Q_i \leq \Delta V_h \quad \text{Expression (2)}$$

$$R_k = \min(R_i, R_h), \; X_k = \min(X_i, X_h)$$

$DG_i$ minimum output value $\leq$
$\qquad Q_i + \Delta Q_i \leq DG_i$ maximum output value
$SVC_i$ minimum output value $\leq Q_i + \Delta Q_i \leq$
$\qquad SVC_i$ maximum output value Note that $DG_i$ denotes a distributed generation having an identifier i. Note also that $SVC_i$ denotes an SVC having an identifier i. Furthermore, n denotes a total number of the distributed generations and the SVCs. Furthermore, $\Delta Q_i$ denotes the value of variation of the reactive power to be outputted by the $DG_i$ or the $SVC_i$. Furthermore, Qi denotes the reactive power currently being output by the $DG_i$ or the $SVC_i$. When the voltage control apparatus 201 does not receive the value of the reactive power being output by the $DG_i$ or the $SVC_i$, $Q_i$ and $Q_j$ are 0. Furthermore, $V_i$ denotes the voltage at a voltage measuring point measured by the $DG_i$ or the $SVC_i$ which corresponds to the identifier i. Furthermore, $R_i$ denotes the resistance value between the $DG_i$ or the $SVC_i$ which corresponds to the identifier i and the distribution substation 101. Furthermore, $R_h$ denotes the resistance value between the voltage measuring point having a voltage to be controlled and the distribution substation 101. Furthermore, $X_i$ denotes a system reactance to the voltage measuring point which corresponds to the identifier i. Furthermore, $X_h$ denotes a system reactance to a voltage measuring point having a voltage to be controlled. Furthermore, $\Delta V_h$ denotes voltage control quantity at a voltage measuring point. Note that h is an identifier which represents a voltage measuring point to be controlled (a voltage measuring point having voltage deviation), and is in a range of 1≤h≤the number m of the voltage measuring points. Thus, the number of first constraints in the expression (2) corresponds to the number of the voltage measuring points having voltage deviation. In Embodiment 1, h is an identifier indicating a voltage measuring point to be controlled (a voltage measuring point having voltage deviation), however, it may be that h is an identifier representing all the voltage measuring points. In this case, performing calculation of control quantity once allows voltage not only at the voltage measuring points having voltage deviation but also at all of the voltage measuring points to fall within a predetermined voltage range. Furthermore, $P_i$ denotes active power to be output by the power regulating apparatus corresponding to the identifier i. In a case where the power regulating apparatuses do not output active power as in Embodiment 1, $P_i=0$.

The expression representing the objective function may be other than the expression (1) as long as the expression can express distribution loss. For example, the objective function may be an expression in which the absolute values of $\Delta Q_i$ where i=1 to n are summed. Furthermore, the objective function may be an expression in which the squares of $\Delta Q_i$ where i=1 to n are summed. More specifically, any expression may be used as an objective function as long as the expression represents the value which corresponds to the sum of the absolute values of $\Delta Q$ output by all of the power regulating apparatuses.

In Embodiment 1, although the value of sending out voltage of the distribution substation 101 is not used for calculating control quantity, the value of sending out voltage of the distribution substation 101 may also be used for calculating control quantity. In this case, the obtaining unit 203 obtains the value of sending out voltage of the distribution substation 101, and transmits the obtained value to the control quantity calculating unit 205, via the communicating unit 202. The control quantity calculating unit 205 can calculate control quantity by replacing $V_h^2$ of the denominator in the left member of the first constraint of the expression (2) with $2 \times V_h^2 - V_o^2$.

As described above, the voltage control apparatus 201 is capable of reducing the sum of the positive and negative reactive power output by the power regulating apparatuses. As a result, it is possible to reduce distribution loss. Furthermore, since the reactive power value to be input or output by each of the power regulating apparatuses is determined according the system impedance, distribution loss can further be reduced.

In Embodiment 1, calculation of control quantity is defined as an optimization problem; however, the present disclosure is not limited to the solution thereof. For example, as long as a specific voltage measuring point can be appropriately determined from among voltage measuring points having voltage deviation, any other method may also be used for calculating control quantity. More specifically, first, a slack variable is introduced to the first constraint expression (relative to voltage) in the expression (2) to convert inequality to equality. Here, if the rated power of the power regulating apparatus is not considered, the inequality constraint becomes an equality constraint. Assume that the slack variable of the constraint expression relative to a specific voltage measuring point (here, a voltage measuring point having a largest voltage deviation) is 0. Next, it is possible to calculate control quantity by making the number n of the reactive power values obtained by a least-square method equal the number m of the constraints, and by using a Lagrange multiplier. Accordingly, the control quantity $\Delta Q_i$ can be calculated such that the voltage value at a specific voltage measuring point among m voltage measuring points having voltage values deviating from the target voltage value is substantially equal to the target voltage value.

(Variation 1)

In general, control delay occurs between the time at which a power regulating apparatus is notified of the control value and the time at which the power regulating apparatus actually outputs the reactive power to the distribution system. Here, in a case where the cycle of control command by the voltage control apparatus 201 is shorter than the control delay of the power regulating apparatus 201, the control by the voltage control apparatus 201 may fail. A description is given below of a voltage control apparatus 201A according to Variation 1 of Embodiment 1 which prevents such a failure from happening.

Figure 5:
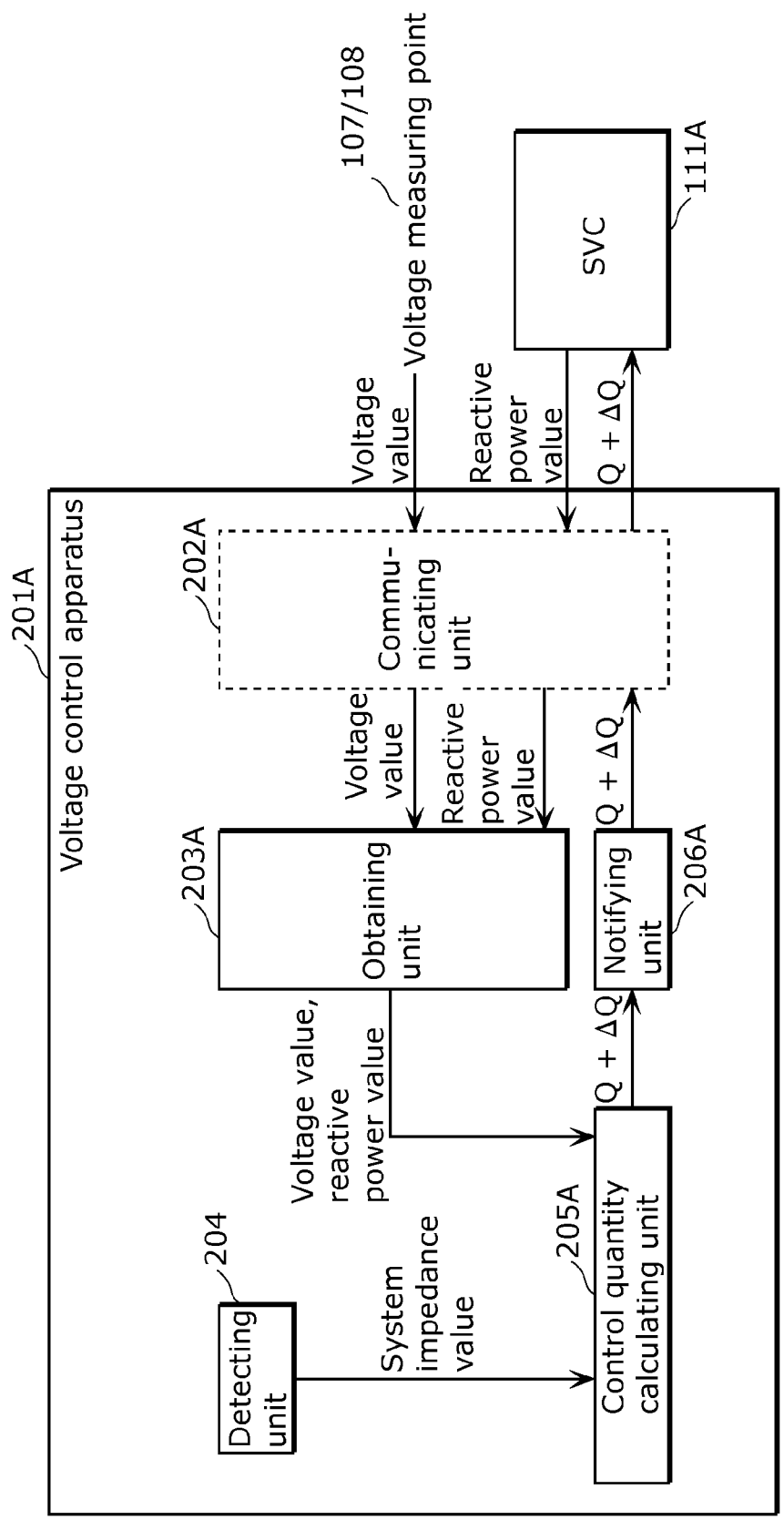
FIG. 5 is a functional block diagram of a voltage control apparatus according to Variation 1 of Embodiment 1.

FIG. 5 is a functional block diagram of the voltage control apparatus 201A according to Variation 1 of Embodiment 1.

In Variation 1, an obtaining unit 203A further obtains reactive power values output by one or more power regulating apparatuses.

Furthermore, in a case where one or more voltage measuring points include a voltage measuring point having a voltage value deviating from a predetermined voltage range at current time t, a control quantity calculating unit 205A compares, with a predetermined value, an absolute value of the difference between (i) the reactive power value $Qm_{it}$ obtained by the obtaining unit 203A at current time t and (ii) a first reactive power value $Q_{it-1}$ calculated at time t−1 as a reactive power value to be output by each of one or more power regulating apparatuses. When the comparison result shows that the absolute value of the difference is greater, the control quantity calculating unit 205A calculates, as control quantity $Q_{it}$, the sum of the reactive power value $\Delta Q_{it}$ calculated at current time t and the reactive power value $Qm_{it}$ obtained by the obtaining unit 203A. On the other hand, the comparison result shows that the predetermined value is greater, the control quantity calculating unit 205A calculates, as control quantity $Q_{it}$, the sum of the reactive power value $\Delta Q_{it}$ calculated at current time t and the first reactive power value $Q_{it-1}$.

In FIG. 5, $\Delta Q$ denotes the reactive power value $\Delta Q_{it}$ calculated at current time t. Furthermore, Q denotes the reactive power value $Qm_{it}$ obtained by the obtaining unit 203A at time t, or the first reactive power value $Q_{it-1}$.

According to the structure above, the power control apparatus 201 can perform appropriate control, regardless of the amount of delay which occurs between the time at which the power regulating apparatus is notified of the control value and the time at which the power regulating apparatus actually outputs the reactive power.

It may be that when the absolute value of the difference between (i) the reactive power value $Qm_{it}$ obtained by the obtaining unit 203A at current time t and (ii) the first reactive power value $Q_{it-1}$ is compared with a predetermined value, and the absolute value of the difference is greater, the control quantity calculating unit 205A calculates the first reactive power value $Q_{it-1}$ as control quantity. It may also be that when the predetermined value is greater, the control quantity calculating unit 205A calculates, as control quantity $Q_{it}$, the value of the sum of the reactive power value $\Delta Q_{it}$ calculated at current time t and the first reactive power value $Q_{it-1}$.

According to this, the control quantity calculating unit 205A does not use the measurement value of the reactive power value output by the power regulating apparatus, for calculating control quantity. As a result, it is possible to prevent control from failing due to a measurement error of the voltage value.

(Variation 2)

In the description above, the power regulating apparatuses assumed to output positive or negative reactive power. Now, referring to FIG. 6, a description is given of a voltage control apparatus in a case where a power regulating apparatus outputs active power in addition to reactive power.

Figure 6:
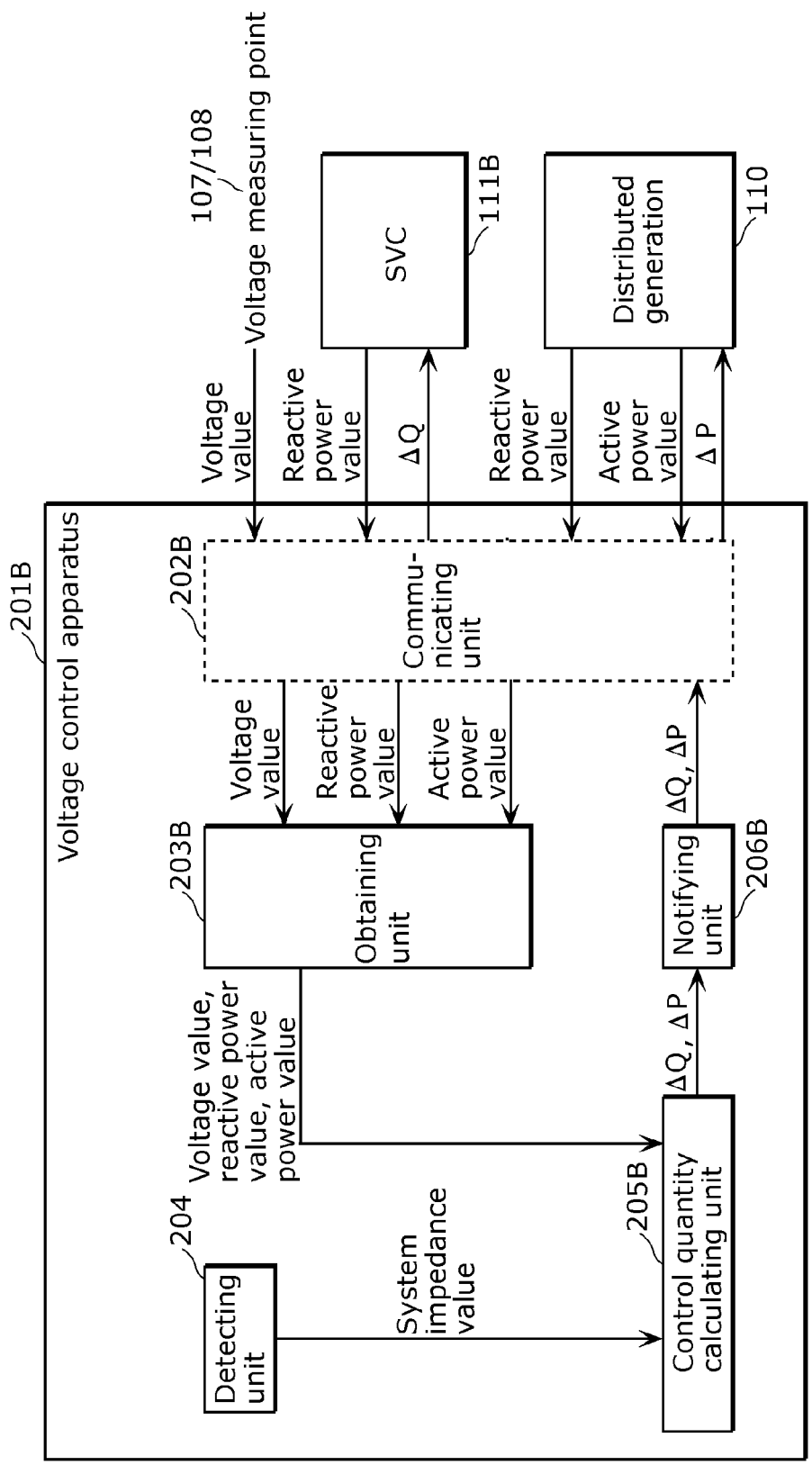
FIG. 6 is a functional block diagram of a voltage control apparatus according to Variation 2 of Embodiment 1.

FIG. 6 is a functional block diagram of a voltage control apparatus 201B according to Variation 2 of Embodiment 1.

In FIG. 6, an SVC 111B and a distributed generation 110 are power regulating apparatuses. Here, the distributed generation 110 is capable of outputting reactive power or active power.

An obtaining unit 203B included in the voltage control apparatus 201B obtains, via a communicating unit 202B, the active power values output by the distributed generation 110, in addition to the reactive power values.

A control quantity calculating unit 205B calculates a power factor of each of the distributed generations, from the reactive power value and the active power value which are output by the distributed generation and which are obtained by the obtaining unit 203B. After that, when the calculated power factor is smaller than a predetermined value, the control quantity calculating unit 205B calculates, as control quantity, an active power suppression value $\Delta P$ which indicates an amount of active power to be suppressed and a reactive power reduction value $\Delta Q$ which indicates an amount of reactive power to be reduced, such that the power factor approximates to the predetermined value.

According to this, the voltage control apparatus 201B is capable of regulating the values of the active power and reactive power to be output such that the power factor ($=P/\sqrt{(P^2+Q^2)}$) falls within an appropriate range.

In the flowchart shown in FIG. 4, when the voltage control apparatus 201 receives voltage deviation information (S301), the voltage control apparatus 201 starts calculating control quantity. However, the voltage control apparatus 201 may start calculating control quantity at different time.

Figure 7:
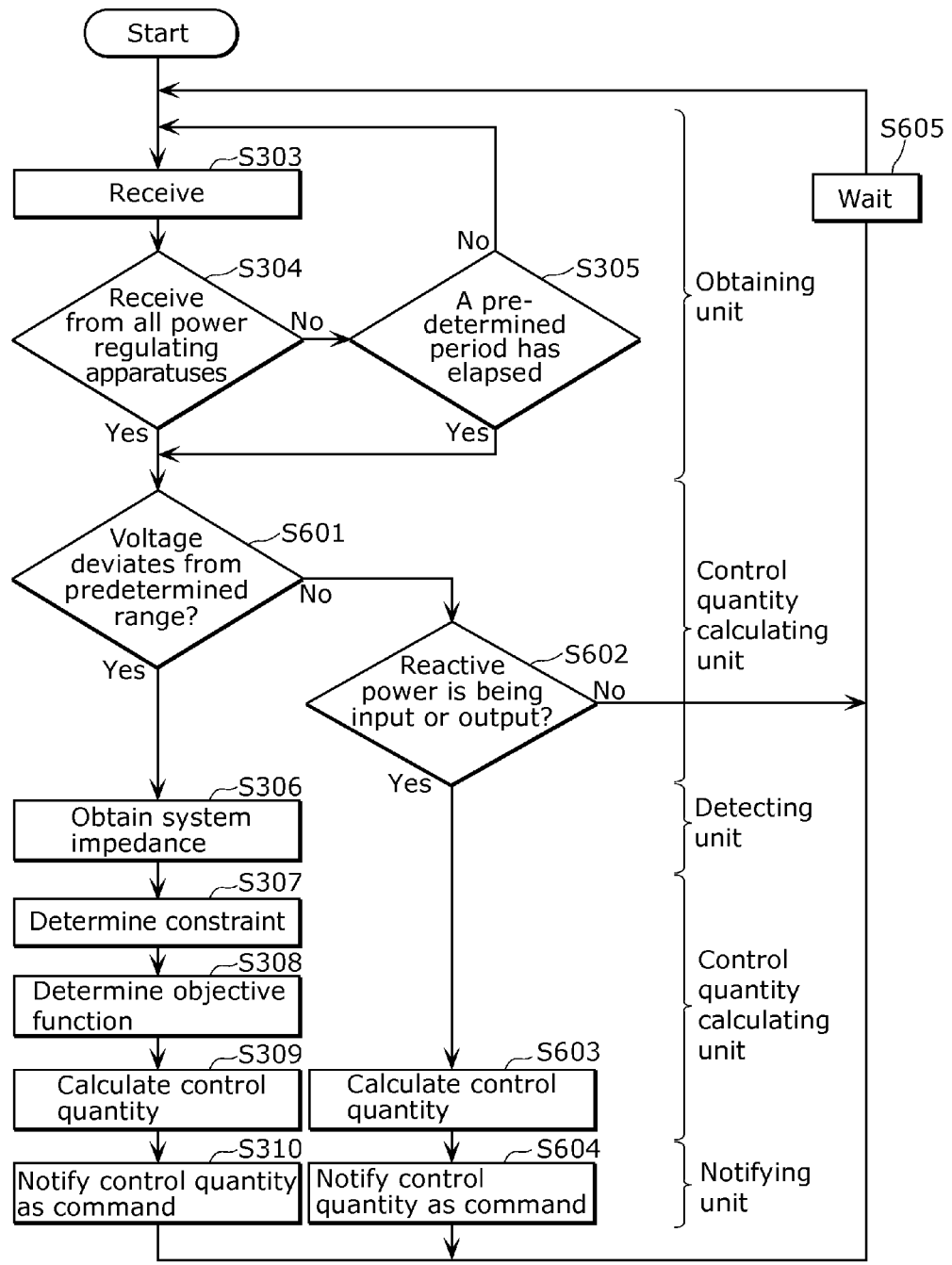
FIG. 7 is a flowchart of another example of processing performed by the voltage control apparatus according to Embodiment 1.

For example, FIG. 7 is a flowchart of another example of processing performed by the voltage control apparatus 201. The processing similar to those in FIG. 4 is identified with the same referential numerals, and their detailed descriptions are not given.

The obtaining unit 203 regularly obtains the voltage values at voltage measuring points regardless of existence of the voltage deviation information (S303). Here, when voltage values are received from all of the power regulating apparatuses (Yes in S304) or when a predetermined period has elapsed (Yes in S305), the control quantity calculating unit 205 determines if the received voltage values include one or more voltage values deviating from a predetermined range (S601).

Here, when the control quantity calculating unit 205 determines that the voltage values deviating from a predetermined range exist (Yes in S601), a detecting unit 204 obtains the system impedances (S306).

On the other hand, when the control quantity calculating unit 205 determines that no voltage value deviates from a predetermined range (No in S601), the control quantity calculating unit 205 then determines whether or not the power regulating apparatuses are inputting or outputting reactive power (S602).

Here, when it is determined that the reactive power has been input or output even though none of the voltage measuring points has voltage values deviating from a predetermined range (Yes in S602), the control quantity calculating unit 205 calculates, as control quantity $Q_{it}$, the reactive power value to be subsequently output by the power regulating apparatus, by multiplying the reactive power value $Qm_{it}$ being output by the power regulating apparatus with an input and output reduction coefficient that is a coefficient smaller than 1 (S603). After that, a notifying unit 206 notifies a corresponding power regulating apparatus of the calculated control quantity $Q_{it}$ (S604), and waits for a next control cycle (S605). On the other hand, when it is determined that the reactive power has not been input or output (No in S602), the notifying unit 206 also waits for a next control cycle (S605), to receive voltage deviation information again (S303).

More specifically, the obtaining unit 203 obtains the reactive power values output by one or more power regulating apparatuses. When none of the voltage values at one or more voltage measuring points deviates from a predetermined voltage range and at least one of one or more power regulating apparatuses is outputting reactive power, the control quantity calculating unit 205 multiplies the reactive power value output by the power regulating apparatus with an input and output reduction coefficient. The control quantity calculating unit 205 may determine the value thus obtained as the reactive power value to be subsequently output by the power regulating apparatus.

When voltage is stable within a predetermined range, it is understood that keeping the power regulating apparatuses to input or output reactive power is unnecessary. Furthermore, causing the power regulating apparatuses to output unnecessary reactive power results in distribution loss. Hence, by multiplying an input and output reduction coefficient to calculate subsequent control quantity, it is possible to further reduce distribution loss caused in the distribution system 100.

Examples of a method for determining an input and output reduction coefficient includes a method described below.

More specifically, it may be that the control quantity calculating unit 205 sets the value of the input and output reduction coefficient closer to 1 as the variation of voltage at one or more voltage measuring points increases, and set the value of the input and output reduction coefficient closer to 0 as the variation of voltage (for example, dV/dt) at one or more voltage measuring points decreases.

In general, the reactive power that can be output by a power regulating apparatus instantaneously is limited. Thus, even when the voltage value at a voltage measuring point is within a predetermined range, excessively reducing the output of the reactive power results in failing to input or output of reactive power necessary for suppressing rapid voltage variation. However, by determining the value of the input and output reduction coefficient according to the amount of voltage variation, even if a rapid voltage variation occurs while reducing output of reactive power, the power regulating apparatus is capable of inputting or outputting reactive power necessary for suppressing rapid variation.

Furthermore, the length of waiting time in Step S605 in FIG. 7 may be determined according to the amount of voltage variation at voltage measuring points. For example, it may be that the control quantity calculating unit 205 regularly receives the voltage value from each power regulating apparatus via the notifying unit 206, and in regularly notifying the power regulating apparatus of the control quantity, the control quantity calculating unit 205 calculates control quantity in a shorter cycle as the amount of voltage variation at one or more voltage measuring points increases, and notifies the power regulating apparatus of the calculated control quantity.

More specifically, for example, where |dV/dt| denotes the voltage variation and T denotes the control cycle of the voltage control apparatus 201, the control cycle after modification may be determined as $T=a\times|dt/dV|$. Here, with respect to predetermined Tmin and Tmax, it is assumed that Tmin≤T≤Tmax, and a>0 are satisfied.

With this, the smaller the variation is, the longer the control cycle is. As a result, it is possible to eliminate unnecessary control performed by the voltage control apparatus 201.

Next, a description is given of an example of processing performed by a power regulating apparatus which outputs positive or negative reactive power to the distribution system 100 for regulating voltage of the distribution system 100. In the description below, when the voltage regulating apparatus detects the voltage value deviating from an appropriate range, the power regulating apparatus controls the voltage value such that the value falls within the proper range, before obtaining a command from the voltage control apparatus 201. This leads to a power regulating apparatus which has a better responsiveness.

More specifically, the power regulating apparatus includes: a terminal information obtaining unit which obtains the reactive power value output by the power regulating apparatus and the voltage value at a point of common coupling; a communicating unit which transmits, to the voltage control apparatus 201, the reactive power value and the voltage value at the point of common coupling that are obtained by the terminal information obtaining unit, and receives, from the voltage control apparatus 201, control quantity that is a value corresponding to the reactive power value to be output by the power regulating apparatus; and an output control unit which controls the reactive power value output by the power regulating apparatus, based on the control quantity received by the communicating unit or the reactive power value and the voltage value obtained by the terminal information obtaining unit.

When the voltage value at the point of common coupling obtained by the terminal information obtaining unit deviates from a predetermined voltage range, the output control unit outputs reactive power so that the voltage value at the point of common coupling falls within the predetermined voltage range.

After the voltage at the point of common coupling falls within the predetermined voltage range, the communicating unit transmits, to the voltage control apparatus 201, the reactive power value obtained by the terminal information obtaining unit and the voltage value at the point of common coupling.

After the communicating unit receives the control quantity from the voltage control apparatus 201, the output control unit controls the reactive power value according to the received control quantity.

Figure 8:
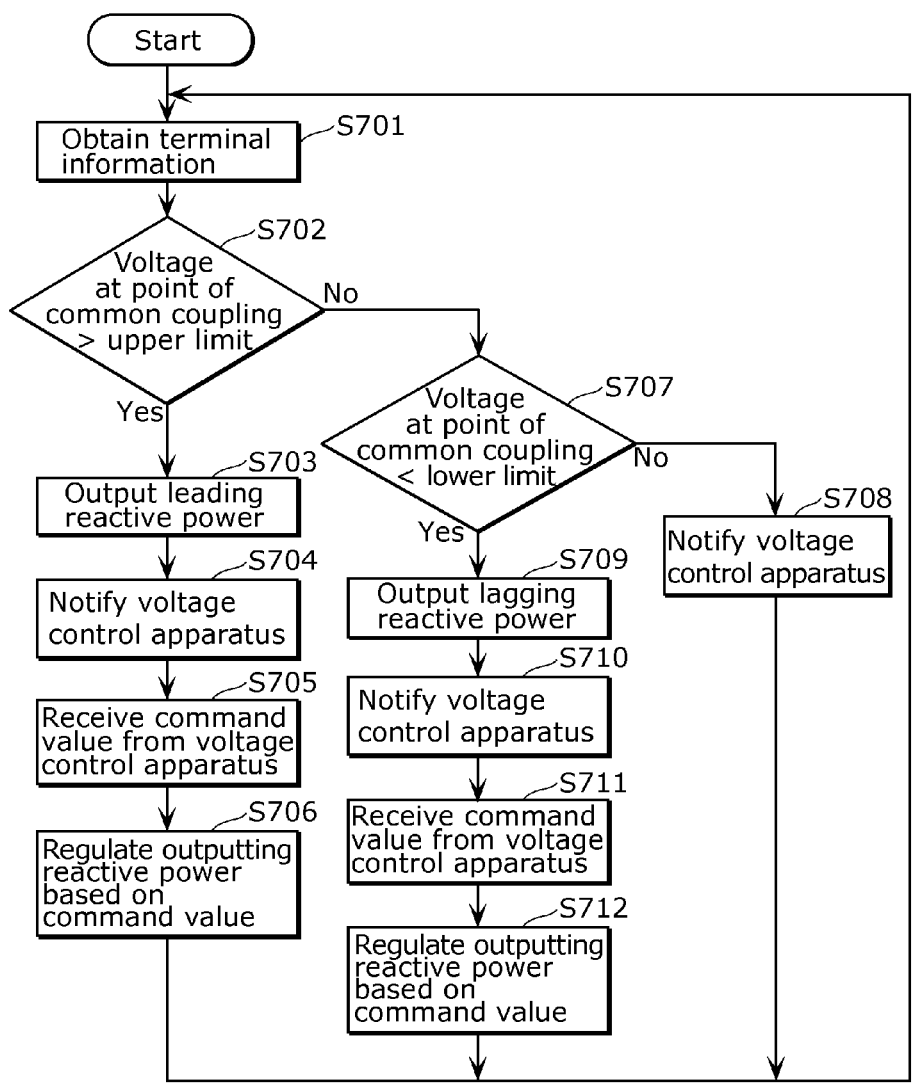
FIG. 8 is a flowchart of processing performed by a power regulating apparatus according to Embodiments 1 and 2.

FIG. 8 is a flowchart of processing performed by each power regulating apparatus.

First, the terminal information obtaining unit obtains terminal information including the reactive power value output by the power regulating apparatus, and the voltage value at a point of common coupling (S701).

Next, the output control unit determines whether or not the voltage at the point of common coupling exceeds the upper limit of a predetermined voltage range (S702).

Here, when the voltage at the point of common coupling exceeds the upper limit (Yes in S702), the output control unit outputs leading reactive power (S703). Furthermore, the notifying unit notifies the voltage control apparatus 201 that the voltage at the point of common coupling exceeds the upper limit (S704). Next, the notifying unit receives control quantity, as a command value from the voltage control apparatus 201 (S705). After that, the output control unit regulates output of the reactive power, based on the command value received from the voltage control apparatus 201 (S706).

On the other hand, when the voltage at the point of common coupling does not exceed the upper limit (No in S702), the output control unit determines whether the voltage at the point of common coupling is less than the lower limit of the predetermined range (S707).

Here, when the voltage at the point of common coupling is less than the lower limit (Yes in S707), the output control unit outputs lagging reactive power (S709). Furthermore, the notifying unit notifies the voltage control apparatus 201 that the voltage at the point of common coupling is lower than the lower limit (S710). Next, the notifying unit receives control quantity as a command value from the voltage control apparatus 201 (S711). After that, the output control unit regulates output of the reactive power, based on the command value received from the voltage control apparatus 201 (S712).

When the voltage at the point of common coupling is greater than or equal to the lower limit (No in S707), the output control unit may notify the voltage control apparatus 201 that the voltage at the point of common coupling is greater than or equal to the lower limit (S708).

In FIG. 8, the power regulating apparatus controls only reactive power. However, in a case where, for example, a distributed generation is used as a power regulating apparatus, the power regulating apparatus may control active power, too.

Next, referring to FIG. 9, and FIGS. 10A to 10C, a description is given of a result of a simulation where the voltage control apparatus controls voltage of the distribution system.

FIG. 9 schematically shows the distribution system used in the simulation.

In the simulation, the loads 109 at the end of a single pole-mounted transformer 104 shown in FIG. 2 are referred to as high-voltage loads 901 to 909. In a similar manner, distributed generations 110 at the end of the single pole-mounted transformer 104 in FIG. 2 are referred to as high-voltage distributed generations 911 to 919. Furthermore, the output of each high-voltage distributed generations 911 to 919 is 0.07 [p.u.] and power consumed by each high-voltage load 901 to 909 is 0 [p.u.].

Furthermore, in FIG. 9, a high-voltage consumer includes a high-voltage load and a high-voltage distributed generation that are connected to the same high-voltage distribution line 102. The distance between each high-voltage consumer is set to 0.3 km. For example, the distance between the high-voltage consumer having the high-voltage load 901 and the high-voltage consumer having the high-voltage load 902 is 0.3 km. Thus, the distance between the distribution substation 101 and the high-voltage consumer having the high-voltage load 909 is 2.7 km obtained by 0.3 km×9.

FIG. 10A shows a result of voltage control in the simulation performed under the conditions described above.

The vertical axis indicates the voltage values at points where respective high-voltage consumers are connected to the high-voltage distribution line 102. Furthermore, the horizontal axis indicates IDs (identifiers) of the distributed generations. More specifically, referring back to FIG. 9 again, the high-voltage distributed generation 911 corresponds to the distributed generation having an ID of 1. The other high-voltage distributed generations are assigned with larger number IDs, as the distance from the distribution substation 101 increases. Thus, the high-voltage distributed generation 919 corresponds to the distributed generation having an ID of 9. Note that ID0 is the distribution substation 101.

In FIG. 10A, a graph 510 is a line graph connecting voltage at respective points of common coupling in a case where the voltage control apparatus 201 does not particularly control voltage. As seen from the graph 510, voltage at the points of common coupling of the distributed generations having IDs 4 to 9 deviate from the upper limit. A graph 514 is a line graph connecting voltage at respective points of common coupling in a case where the voltage control apparatus 201 controls voltage so as to minimize distribution loss. A graph 512 is a line graph connecting voltage at respective points of common coupling in a case where the voltage control apparatus 201 controls voltage in consideration with power loss caused within each power regulating apparatus.

In the simulation, the point of common coupling of the distributed generation having an ID of 9 which has a largest voltage deviation amount is used for a specific voltage measuring point among voltage measuring points. More specifically, the control quantity calculating unit 205 identifies, as a specific voltage measuring point from among voltage measuring points having voltage deviating from a predetermined voltage range, the voltage measuring point having a largest voltage deviation amount.

With respect to the graph 512, the voltage control apparatus 201 which controls voltage in consideration with power loss caused within each power regulating apparatus is, specifically, a voltage control apparatus having a structure described below. More specifically, the voltage control apparatus includes the control quantity calculating unit 205 which calculates, when one or more voltage measuring points includes a voltage measuring point having a voltage value deviating from a predetermined voltage range, the control quantity for each of the power regulating apparatuses to assign the reactive power value to be input or output by each of the power regulating apparatuses according to power loss caused within the power regulating apparatus when the power regulating apparatus outputs the reactive power.

Such a structure allows reduction of power loss caused not only in a distribution line but also within the power regulating apparatus.

The graph 512 and the graph 514 shown in FIG. 10A show that the voltage control apparatus 201 according to Embodiment 1 is capable of controlling voltage such that the voltage at the point of common coupling of the distributed generation having an ID of 9 substantially equal the upper limit.

Figure 10B:
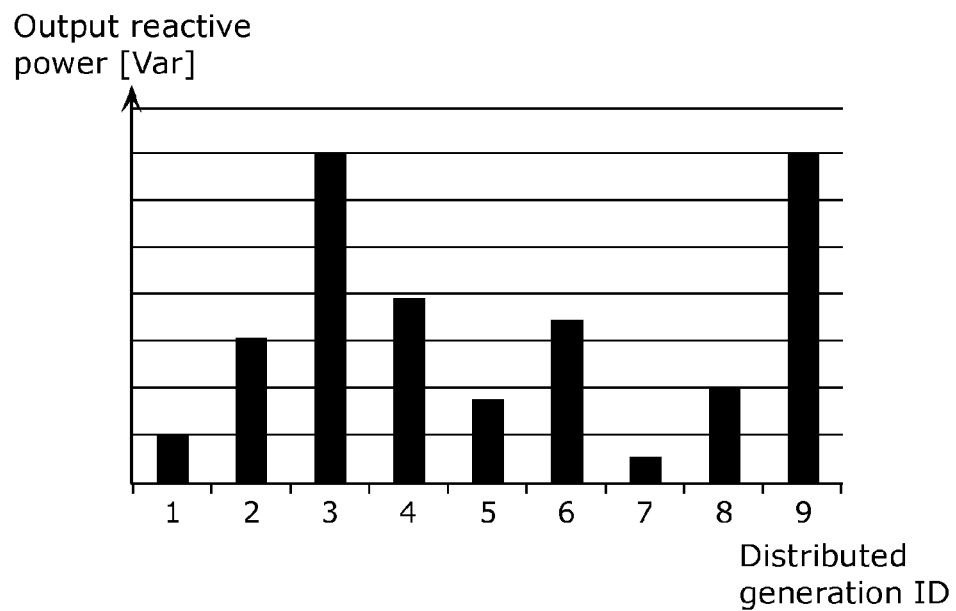
FIG. 10B shows reactive power that the voltage control apparatus caused each distributed generation to output, in a case where the simulation was performed without considering power loss caused within a power regulating apparatus.
Figure 10C:
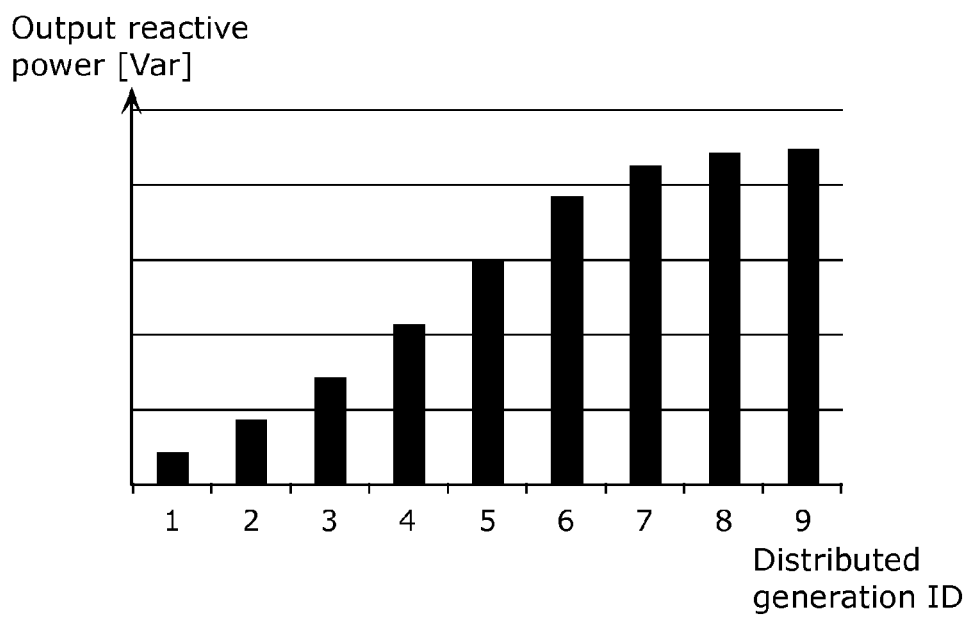
FIG. 10C shows reactive power that the voltage control apparatus caused each distributed generation to output, in a case where the simulation was performed with consideration of power loss caused within a power regulating apparatus.

Next, FIG. 10B shows reactive power that the voltage control apparatus 201 caused each distributed generation to output in the simulation so as to minimize distribution loss. FIG. 10C shows reactive power that the voltage control apparatus 201 caused each distributed generation to output in the simulation in consideration with power loss caused within the power regulating apparatus. In each of the graphs shown in FIG. 10B and FIG. 10C, the vertical axis indicates magnitude [Var] of the reactive power output by each distributed generation. The horizontal axis indicates IDs of the distributed generations.

Comparison between FIG. 10B and FIG. 10C shows that the control quantity notified to each distributed generation significantly varies when the voltage control apparatus 201 performs voltage control in consideration with power loss caused within the distributed generation that is a power regulating apparatus.

Embodiment 2

Next, a description is given of a voltage control apparatus in a case where a distribution system includes an automatic step voltage regulator.

Figure 11:
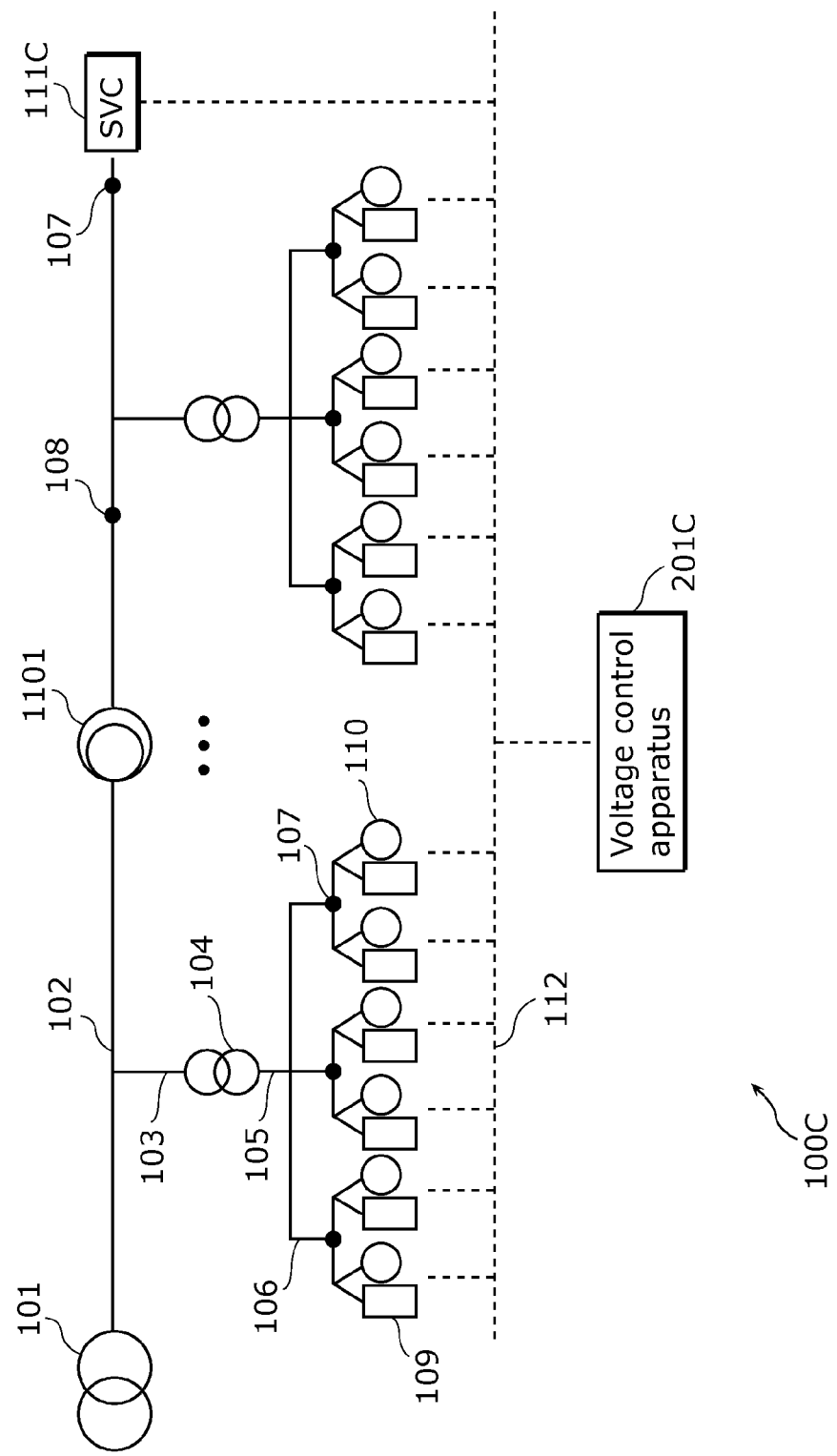
FIG. 11 is a conceptual diagram of a distribution system which includes a voltage control apparatus according to Embodiment 2.

FIG. 11 is a conceptual diagram of a distribution system 100C including a voltage control apparatus 201C according to Embodiment 2. The constituent elements similar to those in FIG. 2 are identified with the same referential numerals, and their detailed descriptions are not given.

As shown in FIG. 11, an automatic step voltage regulator 1101 is interconnected to the distribution system 100C.

The automatic step voltage regulator 1101 transforms voltage transmitted from the secondary of a transformer. More specifically, the automatic step voltage regulator 1101 includes taps which are connection points along a winding that allows different number of turns to be selected. More specifically, by changing taps, turn ratio in a transformer changes. Thus, the automatic step voltage regulator 1101 is capable of regulating voltage in the distribution line connected to the SVC 111C by selecting an appropriate tap position. The automatic step voltage regulator 1101 may also be referred to as SVR.

Figure 12:
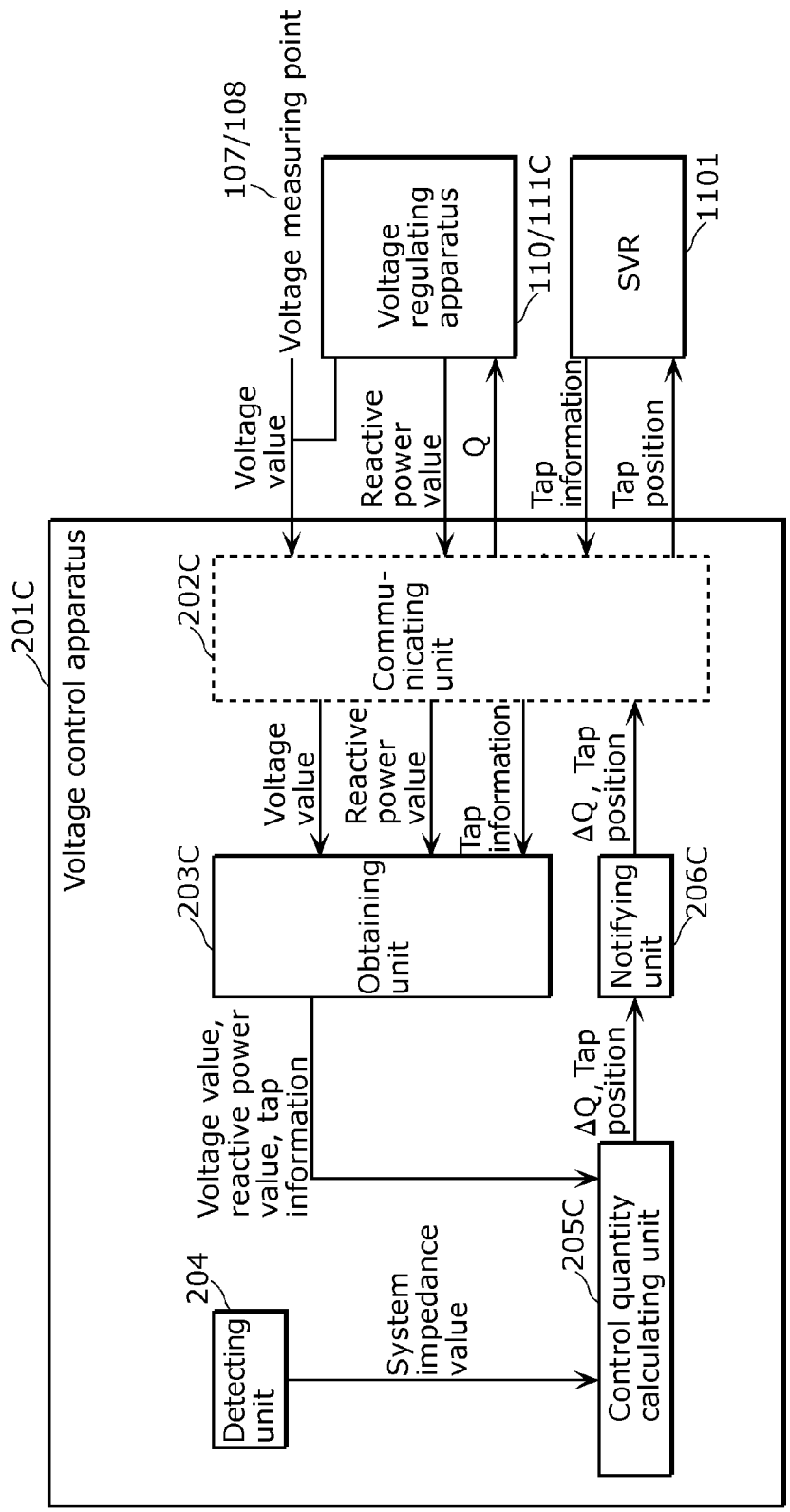
FIG. 12 is a functional block diagram of the voltage control apparatus according to Embodiment 2.

FIG. 12 shows functional blocks of the voltage control apparatus 201C according to Embodiment 2. The constituent elements similar to those included in the voltage control apparatus 201 are identified with the same referential numerals, and their detailed descriptions are not given.

An obtaining unit 203C obtains, via a communicating unit 202C, voltage values at voltage measuring points, and reactive power values output by the power regulating apparatuses. The obtaining unit 203C further obtains tap information from the automatic step voltage regulator 1101.

Here, the tap information refers to information which includes a tap range which indicates a range of transformation performed by the automatic step voltage regulator 1101, a tap position and tap to tap voltage which indicate a current state of transformation performed by the automatic step voltage regulator 1101.

A control quantity calculating unit 205C further calculates, as control quantity, tap positions in the automatic step voltage regulator 1101. Here, the control quantity calculating unit 205C determines a constraint as the following expression (3).

[Expression 3]

$$-\sum_{i}^{n} \frac{Q_i(R_k^2 + X_k^2) + X_k V_h^2}{V_h(2(X_k Q_i + R_k P_i) + V_h^2)} \cdot \Delta Q_i \leq$$

$$(\Delta V_h + \Delta V_{tk} \cdot \Delta t_k)$$

where $R_k = \min(R_i, R_h)$, $X_k = \min(X_i, X_h)$ $DG_i$ minimum output value ≤

$Q_i + \Delta Q_i \leq DG_i$ maximum output value $SVC_i$ minumum output value ≤ $Q_i + \Delta Q_i \leq$ $SVC_i$ maximum output value $SVR_k$ tap minimum value ≤ $t_k + \Delta t_k \leq$ $SVR_k$ tap maximum value Expression (3)

Note that $t_k$ represents a tap position, represented by an identifier k, of an SVR. Note also that $\Delta t_k$ represents the number of taps whose positions were changed from the tap position $t_k$ in the SVR having the identifier k. Note also that $\Delta V_{tk}$ represents tap to tap voltage in the SVR having the identifier k. The other variables are the same as those in the expression (2).

A notifying unit 206C notifies the power regulating apparatuses of the calculated ΔQ, via the communicating unit 202C. The notifying unit 206C further notifies the automatic step voltage regulator 1101 of the calculated tap position, via the communicating unit 202C.

By controlling the tap positions in the automatic step voltage regulator 1101 in such a manner, it is possible to further reduce the reactive power input or output by the power regulating apparatuses. As a result, it is possible to further reduce distribution loss caused in the distribution system 100C.

The structure of each of the voltage control apparatus 201 to 201C described above is merely an example for specifically describing the present disclosure. Each voltage control apparatus disclosed herein does not always have to include all of the structure. In other words, the voltage control apparatus according to the present disclosure is required to include only a minimum structure which allows advantageous effects of the present disclosure.

For example, the voltage control apparatus 201 achieves similar advantageous effects of the present disclosure even without the communicating unit 202. For example, it is sufficient that the obtaining unit 203 obtains voltage values or the like at voltage measuring points, and the notifying unit 206 notifies the SVC 111 of control quantity ΔQ.

FIG. 3 shows only the SVC 111 as a power regulating apparatus, but the distributed generation at each consumer may also output reactive power.

It may also be that voltage transformers included in respective distributed generations measure voltage values at the points of common coupling 107A to 107D that are voltage measuring points. It may also be that a sensor switch measures the voltage value at the measurement point 108.

When (i) multiple voltage measuring points exist which have voltage values deviating from a predetermined voltage range, (ii) the predetermined voltage range includes a first target voltage value and a second target voltage value that is smaller than or equal to the first target voltage value, and (iii) some of the voltage values are above the first target voltage value and some of the voltage values are below the second target voltage value, the voltage control apparatus may have a structure as below. More specifically, the voltage control apparatus may (i) identify, as a first specific point, a voltage measuring point having a largest voltage deviation amount among the voltage measuring points having the voltage values above the first target voltage value, (ii) identify, as a second specific point, a voltage measuring point having a largest voltage deviation amount among the voltage measuring points having the voltage values below the second target voltage value, and (iii) calculate the control quantity such that the voltage value at the first specific point is substantially equal to the first target voltage value and the voltage value at the second specific point is substantially equal to the second target voltage value.

Furthermore, each of the control quantity calculating units according to Embodiment 1, its variations, and Embodiment 2 may calculate, as the control quantity at current time t, an average value of all of control quantities calculated in a predetermined period from the current time t to time t−m, or an average value of largest control quantity and smallest control quantity among the control quantities calculated in the predetermined period.

Embodiment 3

Next, a description is given of a voltage control apparatus installed at home.

Figure 13:
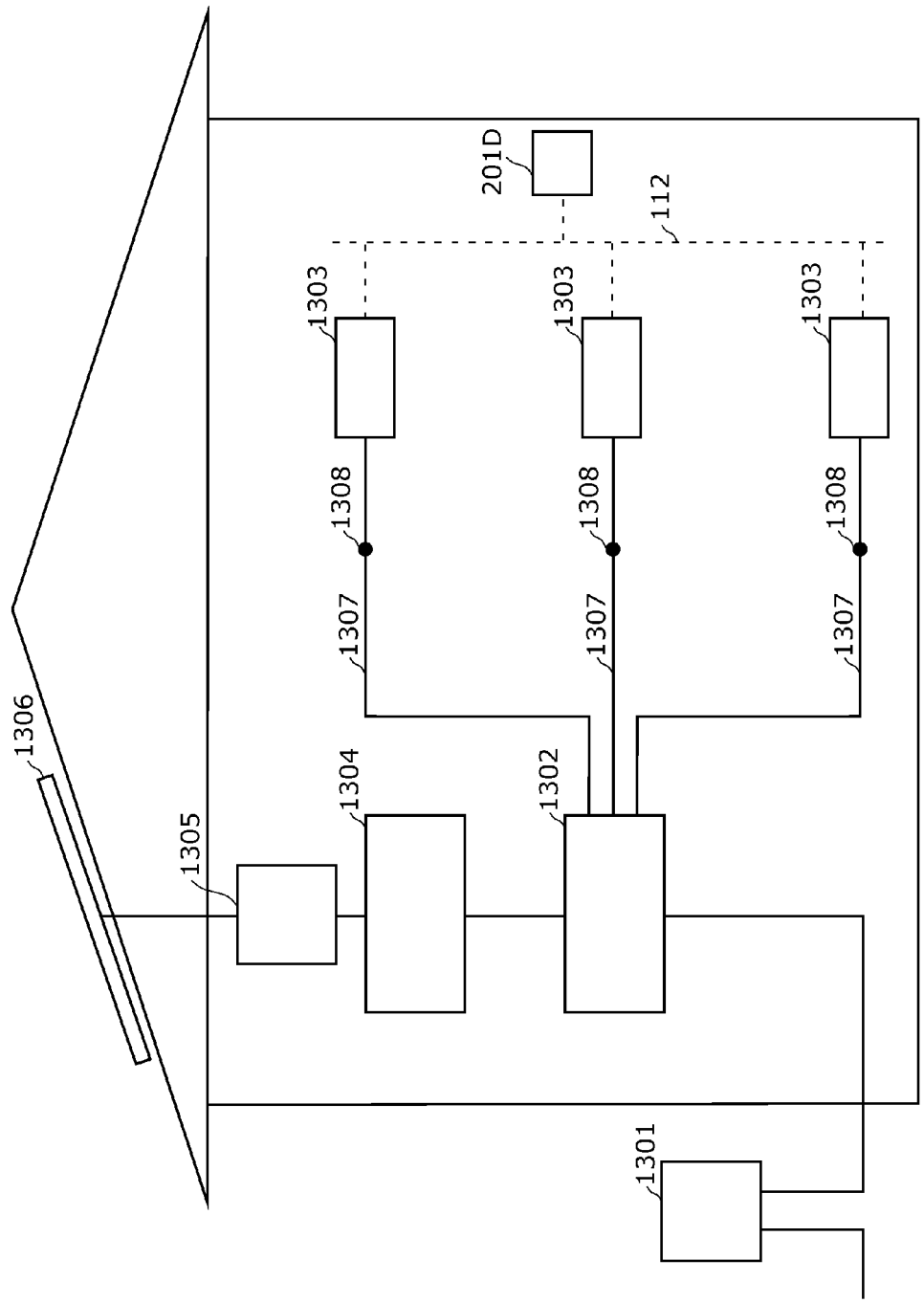
FIG. 13 is a conceptual diagram of a distribution system which includes a voltage control apparatus according to Embodiment 3.

FIG. 13 is a conceptual diagram of a house wiring including a voltage control apparatus 201D according to Embodiment 3. The constituent elements similar to those in FIG. 11 are identified with the same referential numerals, and their detailed descriptions are not given.

The house wiring includes, for example, a meter 1301, a distribution board 1302, distributed generations 1303, a power conditioner 1304, a junction box 1305, a solar panel 1306, electrical cables 1307, voltage measuring points 1308, the voltage control apparatus 201D, and communication lines 112. For simplifying descriptions, each load is omitted. Note that the wiring of the house which does not have a solar power generator does not include the power conditioner 1304, the junction box 1305, and the solar panel 1306.

The meter 1301 is an apparatus which measures power selling or power purchasing amount.

The distribution board 1302 is a box which includes an earth leakage circuit breaker, a molded case circuit breaker, and so on.

Each of the distributed generations 1303 is a power generating system or an electrical energy storage system that are smaller than the distributed generations 110 shown in FIG. 11. The distributed generation 1303 is, for example, a small storage cell included in a load, and operates as a power regulating apparatus. Each distributed generation 1303 controls the magnitude of voltage at a voltage measuring point 1308 by outputting positive or negative reactive power to the distribution system.

The power conditioner 1304, the junction box 1305, and the solar panel 1306 are apparatuses necessary for solar power generation. As described above, the house which does not have a solar power generator does not include the power conditioner 1304, the junction box 1305, and the solar panel 1306.

The power cable 1307 connects the distribution board 1302 and sockets for distributing power.

The voltage measuring points 1308 are points at which the distributed generations 1303 measure voltage, and correspond to the points of common coupling 107A to 107D and the measurement point 108 in FIG. 1.

The voltage control apparatus 201D is a control apparatus which controls one or more power regulating apparatuses such that voltage at voltage measuring points fall within a proper range. The control performed by the voltage control apparatus 201D is the same as those described in Embodiment 1 and its variations.

Embodiment 4

Next, a description is given of a voltage control apparatus installed at an apartment building.

Figure 14:
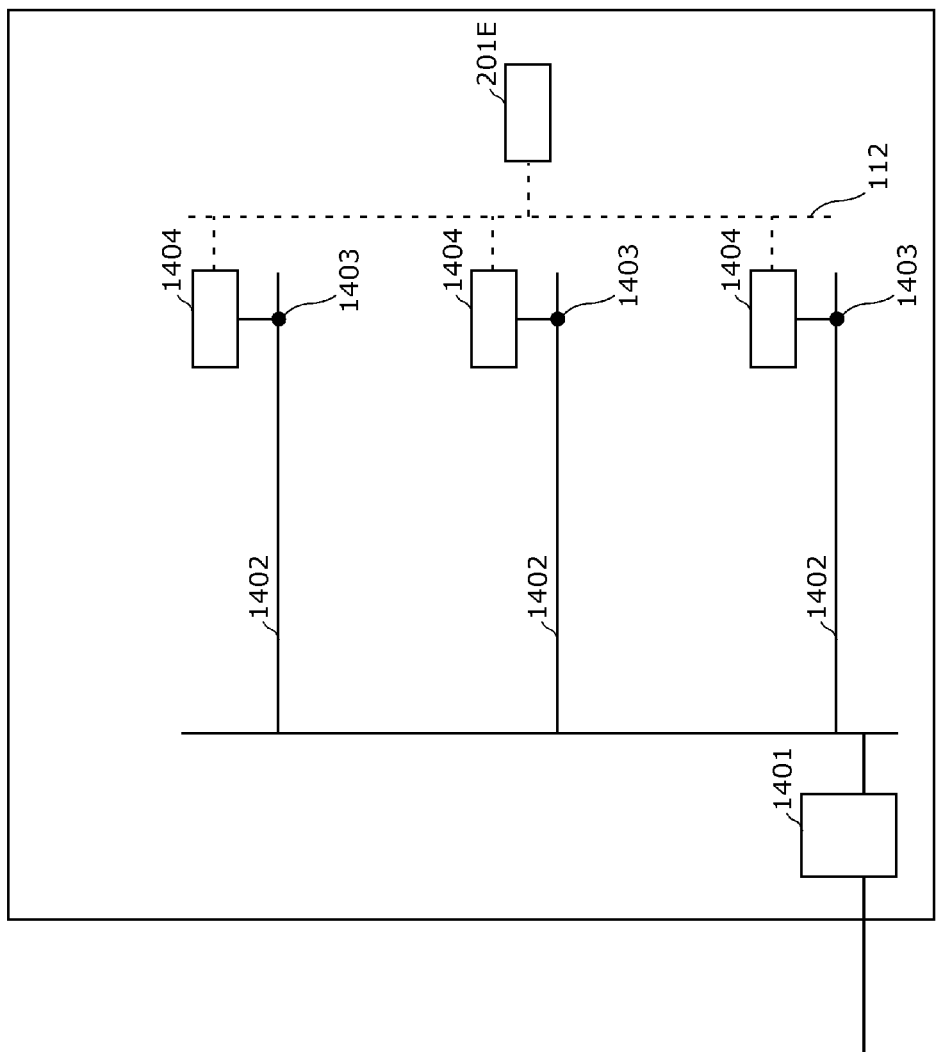
FIG. 14 is a conceptual diagram of a distribution system which includes a voltage control apparatus according to Embodiment 4.

FIG. 14 is a conceptual diagram of wiring within an apartment building including a voltage control apparatus 201E according to Embodiment 4. The constituent elements similar to those in FIG. 11 are identified with the same referential numerals, and their detailed descriptions are not given.

The wiring within the apartment building includes, for example, a cubicle 1401, electrical cables 1402, voltage measuring points 1403, and distributed generations 1404. For simplifying descriptions, each load is omitted.

The cubicle 1401 is a high-voltage receiving and converting equipment.

The electrical cables 1402 are electrical cables for distributing power.

The voltage measuring points 1403 are points at which the distributed generations 1404 measure voltage, and correspond to the points of common coupling 107A to 107D and the measurement point 108 in FIG. 11.

Each of the distributed generations 1404 is a power generating system or an electrical energy storage system that are smaller than the distributed generations 110 shown in FIG. 11. The distributed generation 1404 is, for example, a small storage cell installed at each floor of the apartment building, and operates as a power regulating apparatus. Each distributed generation 1404 controls the magnitude of voltage at a voltage measuring point 1403 by outputting positive or negative reactive power to the distribution system.

The voltage control apparatus 201E is a control apparatus which controls one or more power regulating apparatuses such that voltage at voltage measuring points fall within a proper range. The control performed by the voltage control apparatus 201E is the same as those described in Embodiment 1 and its variations.

Each of the voltage control apparatuses described in Embodiment 1, variations thereof, and Embodiments 2 to 4 can be implemented by a computer.

Figure 15:
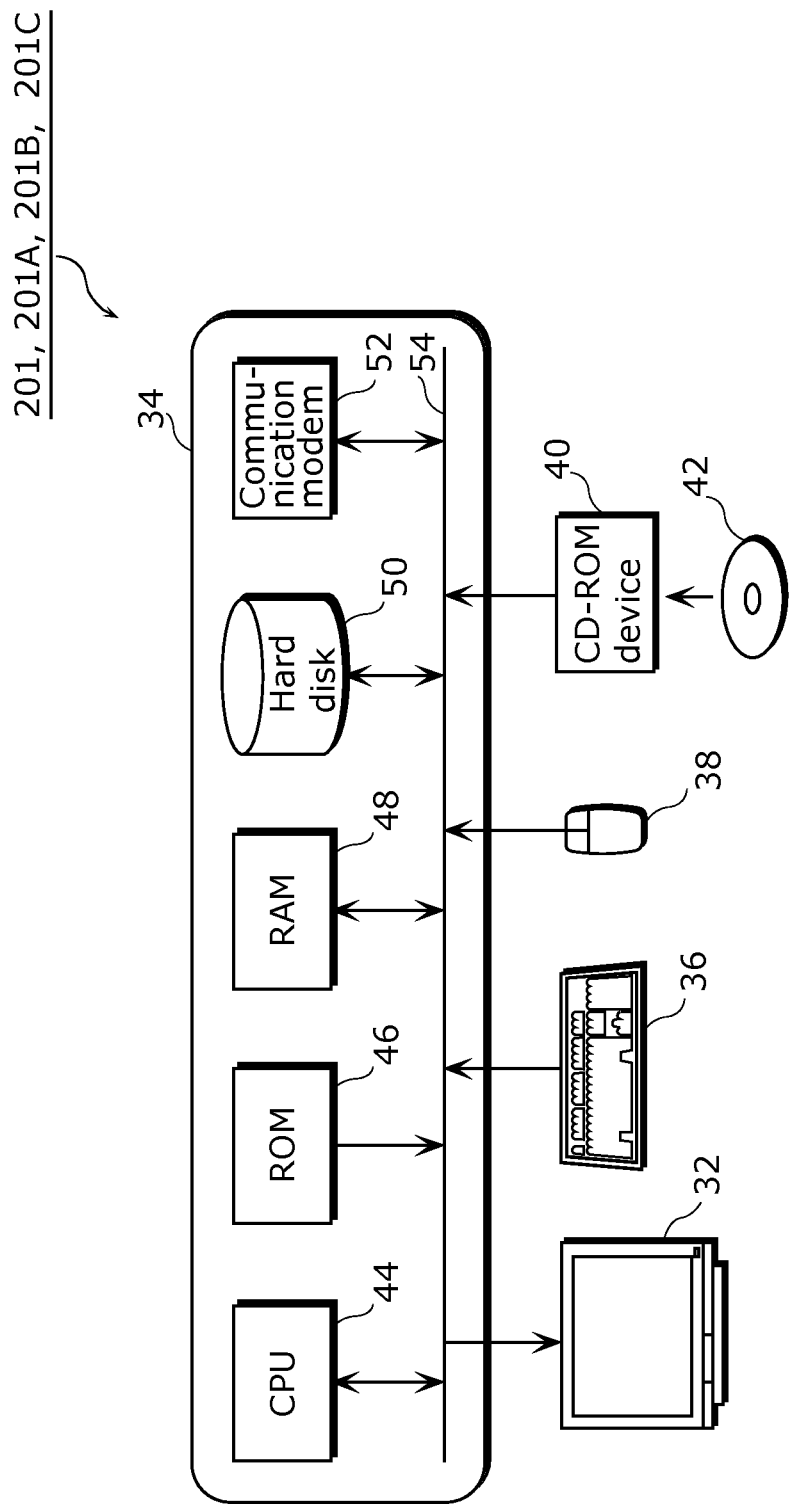
FIG. 15 is a block diagram of a hardware configuration of a computer system implementing voltage control apparatuses according to Embodiment 1, variations thereof, and Embodiments 2, 3, and 4.

FIG. 15 is a block diagram showing a hardware configuration of a computer system implementing the voltage control apparatus 201, the voltage control apparatus 201A, the voltage control apparatus 201B, and the voltage control apparatus 201C. Hereinafter, the voltage control apparatus 201, the voltage control apparatus 201A, the voltage control apparatus 201B, and the voltage control apparatus 201C are collectively referred to voltage control apparatus 201 and the like.

The voltage control apparatus 201 and the like includes, a computer 34, a keyboard 36 and a mouse 38 for instructing the computer 34, a display 32 for presenting information, such as a result of the computation by the computer 34, a compact disc-read only memory (CD-ROM) device 40 for reading a program executed by the computer 34, and a communication modem (not illustrated).

The program that is processing performed by the voltage control apparatus 201 and the like is stored in a CD-ROM 42 that is a computer-readable medium, and is read by the CD-ROM device 40. Alternatively, the program is read by a communication modem 52 via a computer network.

The computer 34 includes a central processing unit (CPU) 44, a read only memory (ROM) 46, a random access memory (RAM) 48, a hard disk 50, the communication modem 52, and a bus 54.

The CPU 44 executes a program read through the CD-ROM device 40 or the communication modem 52. The ROM 46 stores a program and data necessary for operating the computer 34. The RAM 48 stores data, such as a parameter for executing a program. The hard disk 50 stores, for example, a program and data. The communication modem 52 communicates with other computers via the computer network. The bus 54 is interconnected to the CPU 44, the ROM 46, the RAM 48, the hard disk 50, the communication modem 52, the display 32, the keyboard 36, the mouse 38, and the CD-ROM device 40.

A part of or an entire of the constituent elements included in each apparatus above may be configured of a single system Large Scale Integrated circuit (LSI). The system LSI is a super multi-functional LSI manufactured by integrating the constituent elements into a single chip. More specifically, the system LSI is a computer system including a microprocessor, a ROM, a RAM, and the like. The RAM stores a computer program. The microprocessor operates according to the computer program, so that the system LSI fulfills the functions.

Furthermore, a part or an entire of the constituent elements included in each apparatus above may be configured of an IC card detachable from the apparatus or a single module. The IC card or the module is a computer system including the microprocessor, the ROM, the RAM and the like. The IC card or the module may include the super multi-functional LSI. The microprocessor operates according to the computer program, so that the IC card or the module fulfills the functions. The IC card or the module may have tamper-resistance.

The present disclosure may be any of the above methods. Furthermore, the present disclosure may be a computer program which causes a computer to execute these methods, and a digital signal included in the computer program.

Moreover, in the present disclosure, the computer program or the digital signal may be recorded on a computer-readable recording medium, such as a flexible disk, a hard disk, a CD-ROM, an MO, a DVD, a DVD-ROM, a DVD-RAM, a Blu-ray Disc (BD) (Registered trademark), a USB memory, a memory card such as an SD card, and a semiconductor memory.

Moreover, the present disclosure may be the digital signal recorded on these recording media.

Furthermore, in the present disclosure, the computer program or the digital signal may be transmitted via an electronic communication line, a wireless or wired communication line, a network represented by the Internet, data broadcasting, and the like.

Moreover, the present disclosure may be a computer system including a microprocessor and a memory. The memory may store the computer program, and the microprocessor may operate according to the computer program.

Furthermore, the present disclosure may execute the computer program or the digital signal in another independent computer system by recording the computer program or the digital signal on the recording medium and transporting the recording medium, or by transmitting the computer program or the digital signal via a network and the like.

Furthermore, the embodiments and variations described above may be combined.

Embodiments disclosed herein are exemplifications in all respects, and should be regarded as not limiting the scope of the present disclosure. The scope is indicated not by the description above but by Claims, and is intended to include all the modifications within Claims, meanings of equivalents, and the scope of the equivalents.

The descriptive and illustrative embodiments have been described; however, the scope of the appended Claims is not limited to such embodiments. Those skilled in the art will readily appreciate that various modifications may be made in these exemplary embodiments without materially departing from the principles and spirit of the inventive concept, the scope of which is defined in the appended Claims and their equivalents, and that any constituent elements in the embodiments can be combined to obtain other embodiments. Hence, such modifications and other embodiments are included in the present disclosure.

INDUSTRIAL APPLICABILITY

The present disclosure is applicable to a voltage control apparatus and the like which calculates control quantity for controlling voltage of a distribution system interconnected to distributed generations.

The invention claimed is:

1. A voltage control apparatus which controls a plurality of power regulating apparatuses, each of the plurality of power regulating apparatuses outputting, to a distribution system, positive reactive power or negative reactive power for regulating voltage of the distribution system, the voltage control apparatus comprising:
    an obtainer that obtains voltage values at one or more voltage measuring points provided in the distribution system;
    a detector that detects a system impedance value of the distribution system between a substation and each of the plurality of power regulating apparatuses;
    a control quantity calculator that, when the one or more voltage measuring points include a voltage measuring point which has a voltage value deviating from a predetermined voltage range, calculates a value as a control quantity to prevent at least the voltage value deviating from the predetermined voltage range at the voltage measuring point from deviating from a target voltage value set within the predetermined voltage range, the value calculated as the control quantity corresponding to a value of the reactive power to be output by each of the plurality of power regulating apparatuses; and
    a notifier that notifies each of the plurality of power regulating apparatuses of the control quantity calculated by the control quantity calculator,
    wherein the control quantity calculator performs computation by using the voltage values at the one or more voltage measuring points and the system impedance value to calculate the control quantity which (i) causes a voltage value at a specific voltage measuring point to be substantially equal to the target voltage value, and (ii) when the control quantity calculator determines that voltage values at all voltage measuring points having voltage values deviating from the target voltage value deviate from the target voltage value in a same direction, causes each of the plurality of power regulating apparatuses to output only the positive reactive power or only the negative reactive power, the specific voltage measuring point being included in the voltage measuring points having the voltage values deviating from the target voltage value.

2. The voltage control apparatus according to claim 1, wherein the plurality of power regulating apparatuses are interconnected to the distribution system, and
when the one or more voltage measuring points includes a voltage measuring point having a voltage value deviating from the predetermined voltage range, the control quantity calculator calculates the control quantity for each of the plurality of power regulating apparatuses to assign the value of the reactive power to be output by each of the plurality of power regulating apparatuses according to a line resistance value of the system impedance value.

3. The voltage control apparatus according to claim 1, wherein the plurality of power regulating apparatuses are interconnected to the distribution system, and
when the one or more voltage measuring points includes a voltage measuring point having a voltage value deviating from the predetermined voltage range, the control quantity calculator calculates the control quantity for each of the plurality of power regulating apparatuses to assign the value of the reactive power to be input or output by each of the plurality of power regulating apparatuses according to power loss caused within each of the plurality of power regulating apparatuses when each of the plurality of power regulating apparatuses outputs the reactive power.

4. The voltage control apparatus according to claim 1, wherein the obtainer further obtains the value of the reactive power output by each of the plurality of power regulating apparatuses,
when the one or more voltage measuring points include a voltage measuring point having a voltage value deviating from the predetermined voltage range at current time t, the control quantity calculator compares, with a predetermined value, an absolute value of a difference between (i) the value of the reactive power obtained by the obtainer at the current time t, and (ii) a first reactive power value calculated at time t−1 as the value of the reactive power to be output by each of the plurality of power regulating apparatuses, when the absolute value of the difference is greater than the predetermined value, the control quantity calculator calculates, as the control quantity, a value of a sum of (i) the value of the reactive power calculated at the current time t, and (ii) the value of the reactive power obtained by the obtainer at the current time t, and when the predetermined value is greater than the absolute value of the difference, the control quantity calculator calculates, as the control quantity, a value of a sum of (i) the value of the reactive power calculated at the current time t, and (ii) the first reactive power value.

5. The voltage control apparatus according to claim 1, wherein the obtainer further obtains the value of the reactive power output by each of the plurality of power regulating apparatuses, when the one or more voltage measuring points include a voltage measuring point having a voltage value deviating from the predetermined voltage range at current time t, the control quantity calculator compares, with a predetermined value, an absolute value of a difference between (i) the value of the reactive power obtained by the obtainer at the current time t, and (ii) a first reactive power value calculated at time t−1 as the value of the reactive power to be output by each of the plurality of power regulating apparatuses, when the absolute value of the difference is greater than the predetermined value, the control quantity calculator calculates the first reactive power value as the control quantity, and when the predetermined value is greater than the absolute value of the difference, the control quantity calculator calculates, as the control quantity, a value of a sum of (i) the value of the reactive power calculated at the current time t, and (ii) the first reactive power value.

6. The voltage control apparatus according to claim 1, wherein, when the one or more voltage measuring points include a plurality of voltage measuring points having voltage values deviating from the predetermined voltage range, and when all of the voltage values deviating from the predetermined voltage range at the voltage measuring points deviate from the target voltage value in a same direction, the control quantity calculator (i) identifies, as the specific voltage measuring point, a voltage measuring point having a largest voltage deviation amount among the voltage measuring points having the voltage values deviating from the predetermined voltage range, and (ii) calculates the control quantity, which causes the voltage value at the specific voltage measuring point to be substantially equal to the target voltage value.

7. The voltage control apparatus according to claim 1, wherein, when (i) the one or more voltage measuring points include a plurality of voltage measuring points having voltage values deviating from the predetermined voltage range, (ii) the predetermined voltage range includes a first target voltage value and a second target voltage value that is smaller than or equal to the first target voltage value, and (iii) at least one of the voltage values at the voltage measuring points is above the first target voltage value and at least one of the voltage values at the voltage measuring points is below the second target voltage value, the control quantity calculator (i) identifies, as a first specific point, a voltage measuring point having a largest voltage deviation amount among the voltage measuring points having the voltage values above the first target voltage value, (ii) identifies, as a second specific point, a voltage measuring point having a largest voltage deviation amount among the voltage measuring points having the voltage values below the second target voltage value, and (iii) calculates the control quantity, which causes the voltage value at the first specific point to be substantially equal to the first target voltage value and the voltage value at the second specific point to be substantially equal to the second target voltage value.

8. The voltage control apparatus according to claim 1, wherein, when at least one of the plurality of power regulating apparatuses is a distributed generation, the obtainer further obtains a value of reactive power and a value of active power that are output by the distributed generation.

9. The voltage control apparatus according to claim 8, wherein the distributed generation comprises a plurality of distributed generations, the control quantity calculator calculates a power factor of each of the distributed generations from the values of the reactive power and the active power which are output by each of the distributed generations and which are obtained by the obtainer, and when the power factor is smaller than a predetermined value, the control quantity calculator calculates, as the control quantity, an active power suppression value and a reactive power reduction value, which causes the power factor to approximate to the predetermined value, the active power suppression value indicating a value of the active power to be suppressed, and the reactive power reduction value indicating a value of the reactive power to be reduced.

10. The voltage control apparatus according to claim 1, wherein, when the control quantity calculator regularly notifies each of the plurality of power regulating apparatuses of the control quantity via the notifier, the control quantity calculator calculates the control quantity in a shorter cycle as voltage variation at the one or more voltage measuring points increases, and notifies each of the plurality of power regulating apparatuses of the calculated control quantity.

11. The voltage control apparatus according to claim 1, wherein the control quantity calculator calculates, as the control quantity at current time t, an average value of all control quantities calculated in a predetermined period from the current time t to time t-m, or an average value of a largest control quantity and a smallest control quantity among the control quantities calculated in the predetermined period.

12. The voltage control apparatus according to claim 1, wherein the obtainer obtains the value of the reactive power output by each of the plurality of power regulating apparatuses, and when none of the voltage values measured at the one or more voltage measuring points deviates from the predetermined voltage range, and when at least one of the plurality of power regulating apparatuses outputs the reactive power, the control quantity calculator calculates a value of reactive power to be subsequently output by each of the at least one of the plurality of power regulating apparatuses, by multiplying the reactive power value output by the at least one of the plurality of power regulating apparatuses with an input and output reduction coefficient.

13. The voltage control apparatus according to claim 12, wherein the control quantity calculator sets the value of the input and output reduction coefficient to be closer to 1, as voltage variation at the one or more voltage measuring points increases, and sets the value of the input and output reduction coefficient to be closer to 0 as the voltage variation at the one or more voltage measuring points decreases.

14. The voltage control apparatus according to claim 1, wherein the distribution system is connected to an automatic step voltage regulator which regulates secondary voltage of a transformer,
the obtainer further obtains (i) a tap range indicating a range of transformation performed by the automatic step voltage regulator, and (ii) a tap position and tap-to-tap voltage which indicate a state of current transformation performed by the automatic step voltage regulator, and
the control quantity calculator further calculates, as the control quantity, the tap position in the automatic step voltage regulator.

15. A power regulating apparatus which outputs, to a distribution system, positive reactive power or negative reactive power for regulating voltage of the distribution system, the power regulating apparatus comprising:
a terminal information obtainer that obtains a value of the reactive power output by the power regulating apparatus and a voltage value at a point of common coupling;
a communicator that (i) transmits, to the voltage control apparatus according to claim 1, the value of the reactive power and the voltage value at the point of common coupling that are obtained by the terminal information obtainer, and (ii) receives, from the voltage control apparatus, a control quantity that is a value corresponding to the value of the reactive power to be output by the power regulating apparatus; and
an output controller that controls the value of the reactive power output by the power regulating apparatus,
wherein, when the voltage value at the point of common coupling obtained by the terminal information obtainer deviates from the predetermined voltage range, the output controller outputs the reactive power, which causes the voltage value at the point of common coupling to fall within the predetermined voltage range,
after the voltage value at the point of common coupling falls within the predetermined voltage range, the communicator transmits, to the voltage control apparatus, the value of the reactive power obtained by the terminal information obtainer and the voltage value at the point of common coupling, and
after the communicator receives the control quantity from the voltage control apparatus, the output controller controls the value of the reactive power according to the received control quantity.

16. A voltage control method for controlling a plurality of power regulating apparatuses, each of the plurality of power regulating apparatuses outputting, to a distribution system, positive reactive power or negative reactive power for regulating voltage of the distribution system, the voltage control method comprising:
obtaining voltage values at one or more voltage measuring points provided in the distribution system;
detecting a system impedance value of the distribution system between a substation and each of the plurality of power regulating apparatuses;
calculating, when the one or more voltage measuring points include at least one voltage measuring point having a voltage value deviating from a predetermined voltage range, a value as a control quantity to prevent all of the voltage values at the at least one voltage measuring point from deviating from a target voltage value set within the predetermined voltage range, the value calculated as the control quantity corresponding to a value of the reactive power to be output by each of the plurality of power regulating apparatuses; and
notifying each of the plurality of power regulating apparatuses of the control quantity calculated in the calculating,
wherein in the calculating, computation is performed using the voltage values at the one or more voltage measuring points and the system impedance value to calculate the control quantity which (i) causes a voltage value at a specific voltage measuring point to be substantially equal to the target voltage value, and (ii) when the calculating determines that voltage values at all voltage measuring points having voltage values deviating from the target voltage value deviate from the target voltage value in a same direction, causes each of the plurality of power regulating apparatuses to output only the positive reactive power or only the negative reactive power, the specific voltage measuring point being included in the voltage measuring points having the voltage values deviating from the target voltage value.

17. A non-transitory computer-readable recording medium having recorded thereon a program for causing a computer to execute the voltage control method according to claim 16.

18. The voltage control apparatus according to claim 1, wherein the one or more voltage measuring points comprise a plurality of voltage measuring points.

* * * * *